(12) United States Patent
Iwase et al.

(10) Patent No.: US 8,167,064 B2
(45) Date of Patent: May 1, 2012

(54) CONTROL APPARATUS FOR VEHICULAR DRIVE APPARATUS

(75) Inventors: Yuji Iwase, Mishima (JP); Takuma Kakinami, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 919 days.

(21) Appl. No.: 11/987,636

(22) Filed: Dec. 3, 2007

(65) Prior Publication Data
US 2008/0122391 A1   May 29, 2008

(30) Foreign Application Priority Data
Aug. 12, 2006   (JP) .................................. 2006-332635

(51) Int. Cl.
*B60W 10/08*   (2006.01)
*B60W 20/00*   (2006.01)
(52) U.S. Cl. .............................. 180/65.265; 180/65.285
(58) Field of Classification Search ............. 180/65.265, 180/65.285, 65.21, 65.29
See application file for complete search history.

(56) References Cited

U.S. PATENT DOCUMENTS

| | | | | | |
|---|---|---|---|---|---|
| 5,223,775 | A | * | 6/1993 | Mongeau ........................ | 318/432 |
| 5,742,139 | A | * | 4/1998 | Kolomeitsev ................. | 318/400.2 |
| 5,967,940 | A | * | 10/1999 | Yamaguchi .................... | 477/107 |
| 6,483,265 | B1 | * | 11/2002 | Hollenbeck et al. .......... | 318/162 |
| 6,965,824 | B2 | * | 11/2005 | Ichimoto et al. .............. | 701/113 |
| 7,024,871 | B2 | * | 4/2006 | Zhu et al. ........................ | 62/133 |
| 7,222,004 | B2 | * | 5/2007 | Anderson ....................... | 701/22 |
| 7,653,474 | B2 | * | 1/2010 | Cawthorne et al. ............ | 701/99 |

FOREIGN PATENT DOCUMENTS

| | | | |
|---|---|---|---|
| JP | A-02-240448 | | 9/1990 |
| JP | A-09-098516 | | 4/1997 |
| JP | A-11-030325 | | 2/1999 |
| JP | A-11-093725 | | 4/1999 |
| JP | A-2002-078110 | | 3/2002 |
| JP | 2002218789 A | * | 8/2002 |
| JP | 2002364407 A | * | 12/2002 |
| JP | 2006067718 A | * | 3/2006 |
| JP | A-2006-291922 | | 10/2006 |

OTHER PUBLICATIONS

Dec. 13, 2011 Office Action issued in JP Application No. 2006-332635 (with English translation).

* cited by examiner

*Primary Examiner* — J. Allen Shriver, II
*Assistant Examiner* — Chiedu Chibogu
(74) *Attorney, Agent, or Firm* — Oliff & Berridge, PLC

(57) ABSTRACT

A control apparatus for a vehicular drive apparatus including an engine and a motor is provided. The control apparatus includes a controller that determines the operating point of the engine and the operating point of the motor based on the characteristic of the vehicular drive apparatus. When at least one of the operating point of the motor and the operating point of the engine is in at least one of a motor noise occurrence region and a gear noise occurrence region, the controller changes the at least one of the operating point of the motor and the operating point of the engine so that the at least one of the operating point of the motor and the operating point of the engine avoids the at least one of the motor noise occurrence region and the gear noise occurrence region. This suppresses at least one of motor noise and gear noise.

2 Claims, 18 Drawing Sheets

FIG.2

| | C1 | C2 | B1 | B2 | B3 | SPEED RATIO | STEP |
|---|---|---|---|---|---|---|---|
| 1st | O | | | | O | 3.357 | 1.54 |
| 2nd | O | | | O | | 2.180 | 1.53 |
| 3rd | O | | O | | | 1.424 | 1.42 |
| 4th | O | O | | | | 1.000 | 1.42 |
| 5th | O | O | | | | 0.705 | TOTAL 4.76 |
| R | | O | | | O | 3.209 | |
| N | | | | | | | |

CIRCLE: ENGAGED

FIG. 19

|  | C1 | C2 | B1 | B2 | SPEED RATIO | STEP |
|---|---|---|---|---|---|---|
| 1st | O |  |  | O | 2.804 | 1.54 |
| 2nd | O |  | O |  | 1.531 | 1.53 |
| 3rd | O | O |  |  | 1.000 | 1.42 |
| 4th | O | O |  |  | 0.705 | TOTAL 3.977 |
| R |  | O |  | O | 2.393 | |
| N |  |  |  |  |  | |

CIRCLE: ENGAGED

CONTROL APPARATUS FOR VEHICULAR DRIVE APPARATUS

INCORPORATION BY REFERENCE

The disclosure of Japanese Patent Application No. 2006-332635 filed on Dec. 8, 2006, including the specification, drawings and abstract is incorporated herein by reference in its entirety.

BACKGROUND OF THE INVENTION

1. Field of the Invention

The invention relates to a control apparatus for a vehicular drive apparatus that includes an engine and a motor. More specifically, the invention relates to a technology in which the operating point of an engine and the operating point of a motor are determined based on the characteristic of a vehicular drive apparatus.

2. Description of the Related Art

A control apparatus for a vehicular drive apparatus that includes an engine and a motor is available. The control apparatus determines the operating point of the engine and the operating point of the motor based on the characteristic of the vehicular drive apparatus.

An example of such a control apparatus for a vehicular drive apparatus is described in Japanese Patent Application Publication No. 9-98516 (JP-A-9-98516). The vehicular drive apparatus includes a motor that is operated by electric energy stored in an electric power storage device, and an engine that is operated by combustion of fuel, as power sources for driving a vehicle. The control apparatus determines the operating point of the engine and the operating point of the motor based on the characteristic of the vehicular drive apparatus (for example, the system efficiency of the entire drive apparatus, which includes the energy conversion efficiency of the motor and the fuel consumption of the engine), to improve both of driveability and fuel efficiency.

However, when the operating point of the engine and the operating point of the motor are determined, no consideration is given to the fact that motor noise occurs due to the rotation of the motor when a power running control or a power-generation control is executed, or gear noise occurs with regard to gears of a drive system, which are engaged to transmit power, for example, gear noise occurs due to engagement of gears in a planetary gear unit that constitutes a portion of the drive apparatus. Therefore, a new problem may arise that the motor noise or the gear noise noticeably occurs at a specific operating point of the engine or at a specific operating point of the motor.

SUMMARY OF THE INVENTION

The invention provides a control apparatus for a vehicular drive apparatus that includes an engine and a motor, which suppresses occurrence of motor noise and/or gear noise when the operating point of the engine and the operating point of the motor are determined.

An aspect of the invention relates to a control apparatus for a vehicular drive apparatus that includes an engine and a motor. The control apparatus includes a controller that determines an operating point of the engine and an operating point of the motor, based on a characteristic of the vehicular drive apparatus. When the operating point of the motor is in at least one of a motor noise occurrence region and a gear noise occurrence region, the controller changes the operating point of the motor so that the operating point of the motor avoids the at least one of the motor noise occurrence region and the gear noise occurrence region.

In the above-described control apparatus for the vehicular drive apparatus, when the operating point of the motor, which is determined based on the characteristic of the vehicular drive apparatus, is in at least one of the motor noise occurrence region and the gear noise occurrence region, the operating point of the motor is changed so that the operating point of the motor avoids the at least one of the motor noise occurrence region and the gear noise occurrence region. Therefore, it is possible to suppress the occurrence of the motor noise and/or the gear noise that are/is noticeable at the specific operating point of the motor.

Another aspect of the invention relates to a control apparatus for a vehicular drive apparatus that includes an engine and a motor. The control apparatus includes a controller that determines an operating point of the engine and an operating point of the motor, based on a characteristic of the vehicular drive apparatus. When the operating point of the engine is in at least one of a motor noise occurrence region and a gear noise occurrence region, the controller changes the operating point of the engine so that the operating point of the engine avoids the at least one of the motor noise occurrence region and the gear noise occurrence region.

In the above-described control apparatus for the vehicular drive apparatus, when the operating point of the engine, which is determined based on the characteristic of the vehicular drive apparatus, is in at least one of the motor noise occurrence region and the gear noise occurrence region, the operating point of the engine is changed so that the operating point of the engine avoids the at least one of the motor noise occurrence region and the gear noise occurrence region. Therefore, it is possible to suppress the occurrence of the motor noise and/or the gear noise that are/is noticeable at the specific operating point of the engine.

Another aspect of the invention relates to a control apparatus for a vehicular drive apparatus that includes an engine, a motor, and a transmission. The control apparatus includes a controller that determines an operating point of the engine, an operating point of the motor, and a speed ratio of the transmission based on a characteristic of the vehicular drive apparatus. When a vehicle condition is in at least one of a motor noise occurrence region and a gear noise occurrence region, the controller changes the vehicle condition so that the vehicle condition avoids the at least one of the motor noise occurrence region and the gear noise occurrence region, by changing the speed ratio of the transmission.

In the above-described control apparatus for the vehicular drive apparatus, when the vehicle condition, which is determined based on the characteristic of the vehicular drive apparatus, is in at least one of the motor noise occurrence region and the gear noise occurrence region, the vehicle condition is changed so that the vehicle condition avoids the at least one of the motor noise occurrence region and the gear noise occurrence region, by changing the speed ratio of the transmission. Therefore, it is possible to suppress the occurrence of the motor noise and/or the gear noise that are/is noticeable at the specific speed ratio of the transmission. Also, at least one of the operating point of the motor and the operating point of the engine is changed so that the at least one of the operating point of the motor and the operating point of the engine avoids at least one of the motor noise occurrence region and the gear noise occurrence region, by changing the speed ratio of the transmission. Therefore, it is possible to suppress the occurrence of the motor noise and/or the gear noise that are/is noticeable at the specific operating point of the motor and/or the specific operating point of the engine.

BRIEF DESCRIPTION OF THE DRAWINGS

The features, advantages thereof, and technical and industrial significance of this invention will be better understood by reading the following detailed description of embodiments of the invention, when considered in connection with the accompanying drawings, in which:

FIG. 2 is an operation table explaining the combinations of operations of hydraulic frictional engagement devices used in the shift operation of the drive apparatus in FIG. 1;

FIG. 19 is an operation table explaining the combinations of operations of hydraulic frictional engagement devices used in the shift operation of the drive apparatus in FIG. 18, FIG. 19 corresponding to FIG. 2.

DETAILED DESCRIPTION OF EMBODIMENTS

In the following description and the accompanying drawings, the invention will be described in more detail with reference to embodiments.

Figure 1:
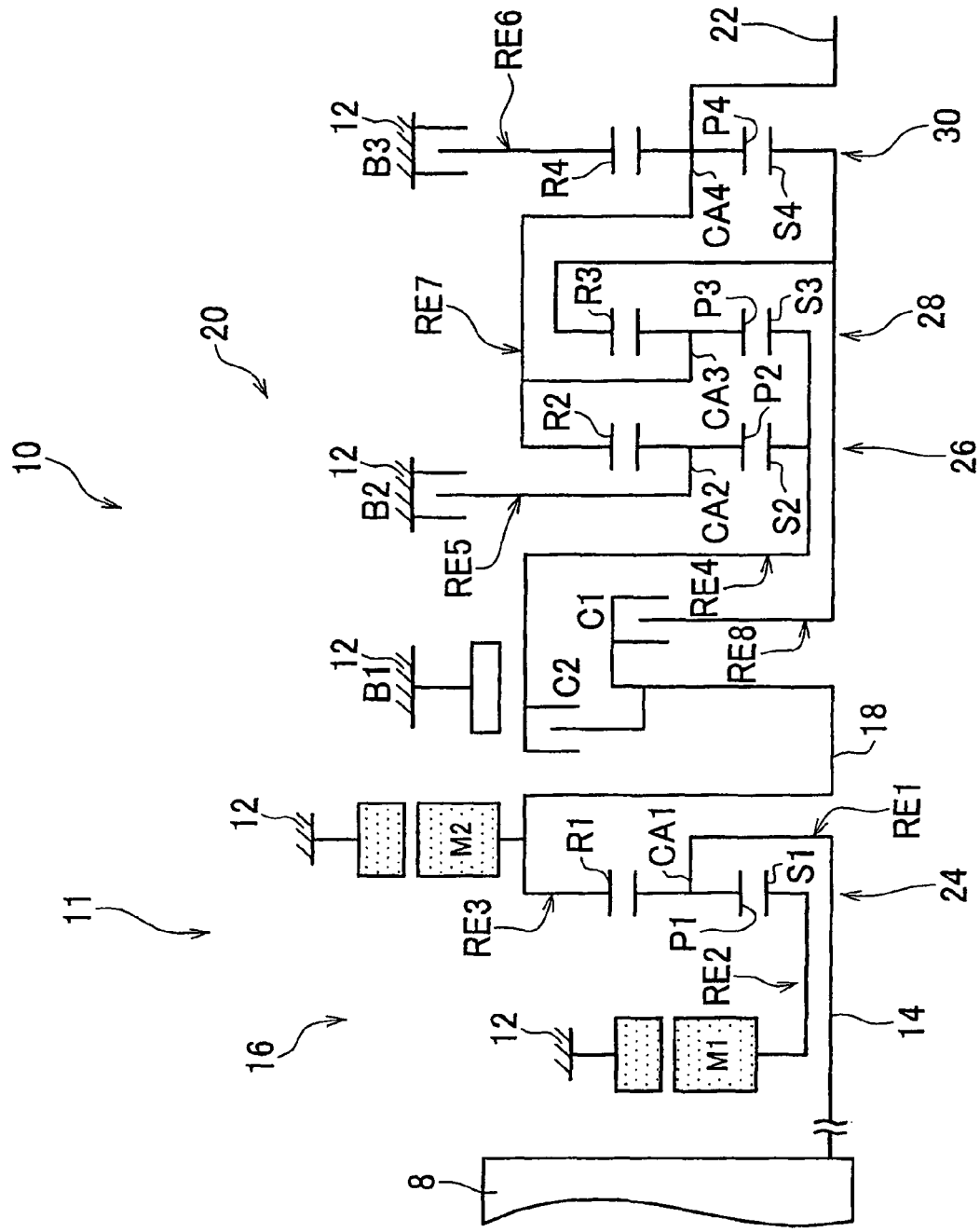
FIG. 1 is a schematic diagram explaining the configuration of a drive apparatus for a hybrid vehicle, to which a control apparatus for a vehicular drive apparatus according to a first embodiment of the invention is applied.

First, a control apparatus for a vehicular drive apparatus according to a first embodiment will be described. FIG. 1 is a schematic diagram explaining a shift mechanism 10 that constitutes a part of a drive apparatus for a hybrid vehicle to which the invention is applied. In FIG. 1, the shift mechanism 10 includes an input shaft 14, a differential portion 11, an automatic shift portion 20, and an output shaft 22 that are provided in series on a common axis in a transmission case (hereinafter, simply referred to as "case") 12. The transmission case 12, which is a non-rotational member, is fitted to a vehicle body. The input shaft 14 is an input rotational member. The differential portion 11, which is a CVT portion, is directly connected to the input shaft 14, or indirectly connected to the input shaft 14 via a pulsation absorption damper (i.e., a vibration-damping device; not shown) or the like. The automatic shift portion 20 is a power transmission portion. The automatic shift portion 20 is provided in a power transmission path between the differential portion 11, and drive wheels 34 (refer to FIG. 7), and directly connected to the differential portion 11 via a transmitting member (transmitting shaft) 18. The output shaft 22, which is an output rotational member, is connected to the automatic shift portion 20. For example, the shift mechanism 10 is provided in a frontengine rear-wheel-dive vehicle where an engine is longitudinally disposed. The shift mechanism 10 is provided in the power transmission path between an internal combustion engine (hereinafter, simply referred to as "engine") 8 such as a gasoline engine or a diesel engine, and a pair of drive wheels 34. The engine 8 is a driving power source for driving the vehicle, which is directly connected to the input shaft 14, or indirectly connected to the input shaft 14 via the pulsation absorption damper (not shown). The shift mechanism 10 transmits power from the engine 8 to the pair of drive wheels 34 via a differential gear unit (final reducer) 32 (refer to FIG. 7), a pair of axles, and the like, which constitute a part of the power transmission path.

Thus, the engine 8 is directly connected to the differential portion 11 in the shift mechanism 10 in the first embodiment. That is, the engine 8 is connected to the differential portion 11 without providing a fluid transmission device such as a torque converter or a fluid coupling between the engine 8 and the differential portion 11. For example, when the engine 8 is connected to the differential portion 11 via the above-described pulsation absorption damper, it is regarded that the engine 8 is directly connected to the differential portion 11. Because the configuration of the shift mechanism 10 is symmetric with respect to the axis thereof, the lower portion of the shift mechanism 10 is omitted in the schematic diagram in FIG. 1. In the schematic diagram in FIG. 18 that shows a drive apparatus according to a third embodiment described later, the lower portion of the shift mechanism 100 is similarly omitted.

The differential portion 11 includes a first motor M1, a power split mechanism 16, and a second motor M2. The power split mechanism 16 is a mechanical mechanism that mechanically distributes the output from the engine 8, which is input to the input shaft 14. That is, the power split mechanism 16 is a differential mechanism that distributes the output from the engine 8 to the first motor M1 and the transmitting member 18. The second motor M2 is operatively connected to the transmitting member 18 so that the second motor M2 is rotated integrally with the transmitting member 18. Each of the first motor M1 and the second motor M2 in the first embodiment is a so-called motor-generator that has the function of generating electric power (power-generation function). The first motor M1 has at least the power-generation function for bearing a reaction force. The second motor M2 has at least a motor function for outputting the driving power as the driving power source. In this specification, the first motor M1 and the second motor M2 may be collectively referred to as "motor M" when the first motor M1 and the second motor M2 are not distinguished from each other.

The power split mechanism 16 mainly includes a first planetary gear unit 24. The first planetary gear unit 24 is of a single pinion type, and has a predetermined gear ratio ρ1 of, for example, approximately "0.418". The first planetary gear unit 24 includes a first sun gear S1, a first planetary gear P1, a first carrier CA1, and a first ring gear R1, which are rotational elements (elements). The first carrier CA1 supports the first planetary gear P1 so that the first planetary gear P1 rotates on its axis, and moves around the first sun gear S1. The first ring gear R1 engages with the first sun gear S1 via the first planetary gear P1. The gear ratio ρ1 is equal to ZS1/ZR1. In this equation, ZS1 represents the number of teeth of the first sun gear S1, and ZR1 represents the number of teeth of the first ring gear R1.

In the power split mechanism 16, the first carrier CA1 is connected to the input shaft 14, that is, the engine 8. The first sun gear S1 is connected to the first motor M1. The first ring gear R1 is connected to the transmitting member 18. When the three elements of the first planetary gear unit 24, that is, the first sun gear S1, the first carrier CA1, and the first ring gear R1 can be rotated relative to each other, the power split mechanism 16 having the above-described configuration is placed in a differential mode in which the differential action can be performed, that is, the differential action is performed. Thus, the output from the engine 8 is distributed to the first motor M1 and the transmitting member 18. Also, electric energy is generated by the first motor M1 using part of the output from the engine 8 that is distributed to the first motor M1, and the generated electric energy is accumulated, or used to rotate the second motor M2. Thus, the differential portion 11 (the power split mechanism 16) functions as an electric differential device. Accordingly, for example, the differential portion 11 is placed in a so-called continuously-variable transmission (CVT) mode (electric CVT mode). That is, the differential portion 11 continuously changes the rotational speed of the transmitting member 18, regardless of the rotational speed of the engine 8. That is, when the power split mechanism 16 is placed in the differential mode, the differential portion 11 is also placed in the differential mode. Thus, the differential portion 11 functions as the electric CVT in which a speed ratio γ0 (the rotational speed $N_{IN}$ of the input shaft 14/the rotational speed $N_{18}$ of the transmitting member 18) is continuously changed from the minimum value γ0 min to the maximum value γ0 max.

The automatic shift portion 20 includes a second planetary gear unit 26 of a single pinion type, a third planetary gear unit 28 of a single pinion type, and a fourth planetary gear unit 30 of a single pinion type. The automatic shift portion 20 functions as a stepped automatic transmission. That is, the automatic shift portion 20 is a planetary gear type automatic transmission with a plurality of gears. The second planetary gear unit 26 includes a second sun gear S2, a second planetary gear P2, a second carrier CA2, and a second ring gear R2. The second carrier CA2 supports the second planetary gear P2 such that the second planetary gear P2 rotates on its axis, and moves around the second sun gear S2. The second ring gear R2 engages with the second sun gear S2 via the second planetary gear P2. The second planetary gear unit 26 has a predetermined gear ratio ρ2 of, for example, approximately "0.562". The third planetary gear unit 28 includes a third sun gear S3, a third planetary gear P3, a third carrier CA3, and a third ring gear R3. The third carrier CA3 supports the third planetary gear P3 such that the third planetary gear P3 rotates on its axis, and moves around the third sun gear S3. The third ring gear R3 engages with the third sun gear S3 via the third planetary gear P3. The third planetary gear unit 28 has a predetermined gear ratio ρ3 of, for example, approximately "0.425". The fourth planetary gear unit 30 includes a fourth sun gear S4, a fourth planetary gear P4, a fourth carrier CA4, and a fourth ring gear R4. The fourth carrier CA4 supports the fourth planetary gear P4 such that the fourth planetary gear P4 rotates on its axis, and moves around the fourth sun gear S4. The fourth ring gear R4 engages with the fourth sun gear S4 via the fourth planetary gear P4. The fourth planetary gear unit 30 has a predetermined gear ratio ρ4 of, for example, approximately "0.421". The gear ratio ρ2 is equal to ZS2/ZR2. In this equation, ZS2 represents the number of teeth of the second sun gear S2, and ZR2 represents the number of teeth of the second ring gear R2. The gear ratio ρ3 is equal to ZS3/ZR3. In this equation, ZS3 represents the number of teeth of the third sun gear S3. ZR3 represents the number of teeth of the third ring gear R3. The gear ratio ρ4 is equal to ZS4/ZR4. In this equation, ZS4 represents the number of teeth of the fourth sun gear S4. ZR4 represents the number of teeth of the fourth ring gear R4.

In the automatic shift portion 20, the second sun gear S2 and the third sun gear S3, which are integrally connected to each other, are selectively connected to the transmitting member 18 via the second clutch C2. Also, the second sun gear S2 and the third sun gear S3 are selectively connected to the case 12 via the first brake B1. The second carrier CA2 is selectively connected to the case 12 via the second brake B2. The fourth ring gear R4 is selectively connected to the case 12 via the third brake B3. The second ring gear R2, the third carrier CA3, and the fourth carrier CA4, which are integrally connected to each other, are connected to the output shaft 22. The third ring gear R3 and the fourth sun gear S4, which are integrally connected to each other, are selectively connected to the transmitting member 18 via the first clutch C1.

Thus, the automatic shift portion 20 is selectively connected to the differential portion 11 (the transmitting member 18) via the first clutch C1 or the second clutch C2 that is used to select the gear of the automatic shift portion 20. In other words, each of the first clutch C1 and the second clutch C2 functions as an engagement device that selectively switches the state of the power transmission path between the transmitting member 18 and the automatic shift portion 20, that is, the power transmission path from the differential portion 11 (the transmitting member 18) to the drive wheels 34. The state of the power transmission path is selectively switched between a power-transmission permitted state and a power-transmission interrupted state. When the power transmission path is in the power-transmission permitted state, the transmission of power is permitted. When the power transmission path is in the power-transmission interrupted state, the transmission of power is interrupted. That is, when at least one of the first clutch C1 and the second clutch C2 is engaged, the power transmission path is placed in the power-transmission permitted state. When the first clutch C1 and the second clutch C2 are disengaged, the power transmission path is placed in the power-transmission interrupted state.

When a hydraulic frictional engagement device that needs to be disengaged (hereinafter, referred to as "disengagement-side engagement device") is disengaged, and a hydraulic frictional engagement device that needs to be engaged (hereinafter, referred to as "engagement-side engagement device") is engaged in the automatic shift portion 20, a clutch-to-clutch shift is performed. As a result, one of the first gear to the fourth gear, or the reverse gear, or the neutral state is selected. Thus, the speed ratio γ (=the rotational speed $N_{18}$ of the transmitting member 18/the output-shaft rotational speed $N_{OUT}$ of the output shaft 22) at each gear is achieved. The speed ratio γ changes substantially geometrically. As shown in an engagement operation table in FIG. 2, for example, when the shift mechanism 10 functions as the stepped transmission, the first gear, at which a speed ratio γ1 is set to the maximum value, for example, approximately "3.357", is selected by engaging the first clutch C1 and the third brake B3. The second gear, at which a speed ratio γ2 is set to a value smaller than the speed ratio γ1, for example, approximately "2.180", is selected by engaging the first clutch C1 and the second brake B2. The third gear, at which a speed ratio γ3 is set to a value smaller than the speed ratio γ2, for example, approximately "1.424", is selected by engaging the first clutch C1 and the first brake B1. The fourth gear, at which a speed ratio γ4 is set to a value smaller than the speed ratio γ3, for example, approximately "1.000", is selected by engaging the first clutch C1 and the second clutch C2. As shown in FIG. 2, the fifth gear is selected by engaging both of the first clutch C1 and the second clutch C2. That is, in the automatic shift portion 20, both of the first clutch C1 and the second clutch C2 are engaged at the fifth gear, as well as at the fourth gear. However, in the differential portion 11, the rotational speed of the transmitting member 18 is higher than the rotational speed of the input shaft 14 at the fifth gear, though the rotational speed of the transmitting member 18 is equal to the rotational speed of the input shaft 14 at the fourth gear. The "reverse gear", at which a speed ratio γR is set to a value between the speed ratios γ1 and γ2, for example, approximately "3.209", is selected by engaging the second clutch C2 and the third brake B3. The neutral state "N" is selected by disengaging the first clutch C1, the second clutch C2, the first brake B1, the second brake B2, and the third brake B3.

The first clutch C1, the second clutch C2, the first brake B1, the second brake B2, and the third brake B3 (hereinafter, collectively referred to as "clutches C" and "brakes B" unless a specific clutch or a specific brake needs to be distinguished from the other clutches or the other brakes) are hydraulic frictional engagement devices that are generally used in conventional automatic transmissions. Each of the clutches C and the brakes B may be a wet multiple disc type clutch and brake in which a plurality of stacked frictional plates are pressed by a hydraulic actuator. Each of the brakes B may be a band brake in which one or two bands is (are) wound around the outer peripheral surface of a drum that is rotated, and the end(s) of the one or two bands is (are) tightened by a hydraulic actuator. Each of the clutches C and the brakes B selectively connects members that are provided on both sides thereof.

In the shift mechanism 10 that has the above-described configuration, the CVT is formed by combining the differential portion 11 that functions as the CVT with the automatic shift portion 20. When the speed ratio of the differential portion 11 is controlled to be constant, the stepped transmission is substantially formed by combining the differential portion 11 with the automatic shift portion 20.

More specifically, when the differential portion 11 functions as the CVT, and the automatic shift portion 20, which is connected to the differential portion 11 in series, functions as the stepped transmission, the rotational speed input to the automatic shift portion 20 (hereinafter, referred to as "input rotational speed for the automatic shift portion 20") at least one gear M of the automatic shift portion 20, that is, the rotational speed of the transmitting member 18 (hereinafter, referred to as "transmitting-member rotational speed $N_{18}$") is continuously changed. As a result, the speed ratio is continuously changed in a certain range at the at least one gear M. Accordingly, the total speed ratio γT of the shift mechanism 10 (=the rotational speed $N_{IN}$ of the input shaft 14/the rotational speed $N_{OUT}$ of the output shaft 22) is continuously changed. Thus, the CVT is formed in the shift mechanism 10. The total speed ratio γT of the shift mechanism 10 is determined based on the speed ratio γ0 of the differential portion 11 and the speed ratio γ of the automatic shift portion 20.

For example, the transmitting-member rotational speed $N_{18}$ is continuously changed at each of the first gear to the fourth gear, and the reverse gear of the automatic shift portion 20 shown in the engagement operation table in FIG. 2. Thus, the speed ratio is continuously changed in a certain range at each of the first gear to the fourth gear, and the reverse gear. As a result, the speed ratio is continuously changed between the first gear and the second gear, between the second gear and the third gear, and between the third gear and the fourth gear. Accordingly, the total speed ratio γT of the entire shift mechanism 10 is continuously changed. The ratio of the speed ratio at a gear to a speed ratio at an adjacent higher gear (i.e., step) is shown in the section "STEP" in FIG. 2. As shown in the section "TOTAL" in FIG. 2, the ratio of the speed ratio at first gear to the speed ratio at the fifth gear is 4.76.

When the speed ratio of the differential portion 11 is controlled to be constant, and the clutches C and the brakes B are selectively engaged to select any one of the first gear to the fourth gear, and the reverse gear, the total speed ratio γT of the entire shift mechanism 10 at each gear is achieved. The total speed ratio γT changes substantially geometrically. Accordingly, in the shift mechanism 10, the stepped transmission is substantially formed.

For example, when the speed ratio γ0 of the differential portion 11 is controlled to be fixed to "1", the total speed ratio γT of the shift mechanism 10 at each of the first gear to the fourth gear, and the reverse gear of the automatic shift portion 20 is achieved, as shown in the engagement operation table in FIG. 2. When the speed ratio γ0 of the differential portion 11 is fixed to a value smaller than "1", for example, approximately 0.7, at the fourth gear of the automatic shift portion 20, the total speed ratio γT is set to a value smaller than "1" at the fourth gear, for example, approximately "0.705". That is, the total speed ratio γT at the fifth gear is achieved, as shown in the engagement operation table in FIG. 2.

Figure 3:
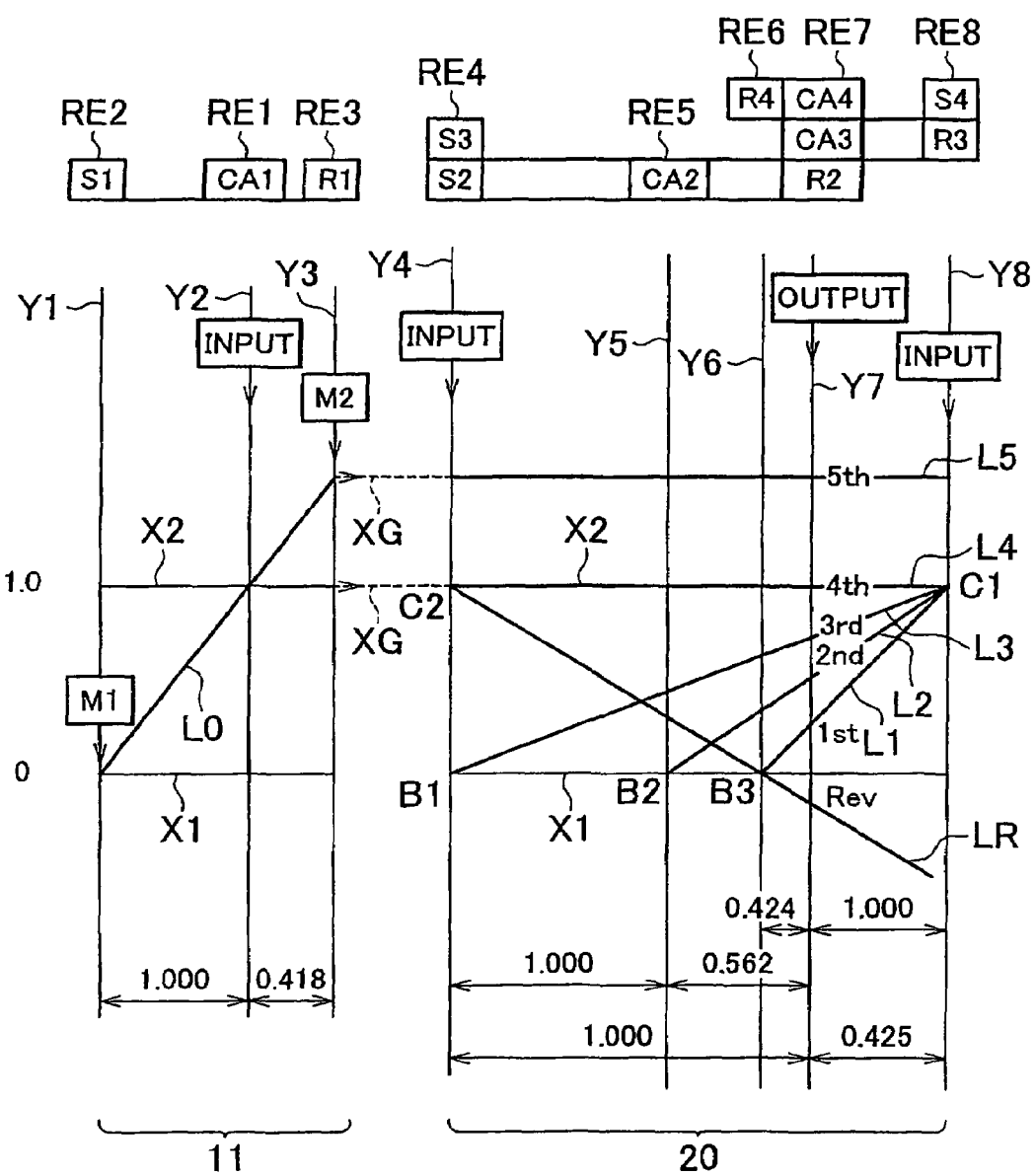
FIG. 3 is a collinear diagram explaining the relative rotational speeds at each gear in the drive apparatus in FIG. 1.

FIG. 3 is a collinear diagram in which straight lines indicate the relative relation among the rotational speeds of the rotational elements in the shift mechanism 10 that includes the differential portion 11 and the automatic shift portion 20. Each of the rotational elements is in a connected state or disconnected state at each gear. The collinear diagram in FIG. 3 is a two dimensional coordinate. In the collinear diagram in FIG. 3, the horizontal axis indicates the relation among the gear ratios ρ(ρ1, ρ2, ρ3, and ρ4) of the planetary gear units 24, 26, 28, and 30, and the vertical axis indicates relative rotational speeds. The horizontal line X1 among the three horizontal lines indicates the rotational speed of "0". The horizontal line X2 indicates the rotational speed of "1.0", that is, a rotational speed $N_E$ of the engine 8 connected to the input shaft 14. The horizontal line XG indicates the rotational speed of the transmitting member 18.

The three vertical lines Y1, Y2, and Y3 indicate the relative rotational speeds of the three rotational elements of the power split mechanism 16 that constitutes the differential portion 11. That is, the vertical line Y1 indicates the relative rotational speed of the first sun gear S1 that is regarded as a second rotational element (second element) RE2. The vertical line Y2 indicates the relative rotational speed of the first carrier CA1 that is regarded as a first rotational element (first element) RE1. The vertical line Y3 indicates the relative rotational speed of the first ring gear R1 that is regarded as a third rotational element (third element) RE3. The intervals between the vertical lines Y1 and Y2, and between the vertical lines Y2 and Y3 are set based on the gear ratio ρ1 of the first planetary gear unit 24. Further, the five vertical lines Y4, Y5, Y6, Y7, and Y8 indicate the relative rotational speeds of the rotational elements of the automatic shift portion 20. That is, the vertical line Y4 indicates the relative rotational speed of the second sun gear S2 and the third sun gear S3, which are connected to each other, and which are regarded as a fourth rotational element (fourth element) RE4. The vertical line Y5 indicates the relative rotational speed of the second carrier CA2 that is regarded as a fifth rotational element (fifth element) RE5. The vertical line Y6 indicates the relative rotational speed of the fourth ring gear R4 that is regarded as a sixth rotational element (sixth element) RE6. The vertical line Y7 indicates the relative rotational speed of the second ring gear R2, the third carrier CA3, and the fourth carrier CA4, which are connected to each other, and which are regarded as a seventh rotational element (seventh element) RE7. The vertical line Y8 indicates the relative rotational speed of the third ring gear R3 and the fourth sun gear S4, which are connected to each other, and which are regarded as an eighth rotational element (eighth element) RE8. The intervals between the vertical lines are set based on the gear ratios ρ2 of the second planetary gear unit 26, the gear ratio ρ3 of the third planetary gear unit 28, and the gear ratio ρ4 of the fourth planetary gear unit 30. In the collinear diagram, the interval between the sun gear and the carrier is set to indicate "1". The interval between the carrier and the ring gear is set to indicate the gear ratio ρ(ρ1, ρ2, ρ3, or ρ4). That is, in the differential portion 11, the interval between the vertical lines Y1 and Y2 is set to indicate "1", and the interval between the vertical lines Y2 and Y3 is set to indicate the gear ratio ρ1. In the automatic shift portion 20, the interval between the sun gear and the carrier in each of the second planetary gear unit 26, the third planetary gear unit 28, and the fourth planetary gear unit 30 is set to indicate "1". The interval between the carrier and the ring gear in each of the second planetary gear unit 26, the third planetary gear unit 28, and the fourth planetary gear unit 30 is set to indicate the gear ratio ρ(ρ2, ρ3, or ρ4).

As shown in the collinear diagram in FIG. 3, in the power splint mechanism 16 (the differential portion 11) in the shift mechanism 10 in the first embodiment, the first rotational element RE1 (the first carrier CA1) is connected to the input shaft 14, that is, the engine 8, and the second rotational element RE2 is connected to the first motor M1, and the third rotational element (the first ring gear R1) RE3 is connected to the transmitting member 18 and the second motor M2. Thus, the rotation of the input shaft 14 is transmitted (input) to the automatic shift portion 20 via the transmitting member 18. In this case, the oblique straight line L0 that passes through the intersection of the lines Y2 and X2 indicates the relation between the rotational speed of the first sun gear S1 and the rotational speed of the first ring gear R1.

For example, the differential portion 11 may be placed in the differential mode so that the first rotational element RE1 to the third rotational element RE3 can be rotated relative to each other, and the rotational speed of the first ring gear R1, which depends on the vehicle speed V, may be substantially constant. In this case, when the rotational speed of the first sun gear S1 is increased or decreased by controlling the rotational speed of the first motor M1, the rotational speed of the first carrier CA1, that is, the engine speed $N_E$ is increased or decreased. The rotational speed of the first ring gear R1 is indicated by the intersection of the straight line L0 and the vertical line Y3, and depends on a vehicle speed V. The rotational speed of the first sun gear S1 is indicated by the intersection of the straight line L0 and the vertical line Y1. The rotational speed of the first carrier CA1 is indicated by the intersection of the straight line L0 and the vertical line Y2.

When the rotational speed of the first sun gear S1 is made equal to the rotational speed of the engine speed $N_E$ by controlling the rotational speed of the first motor M1 so that the speed ratio γ0 of the differential portion 11 is fixed to "1", the straight line L0 matches the horizontal line X2. Thus, the transmitting member 18 is rotated such that the rotational speed of the first ring gear R1 is equal to the engine speed $N_E$. When the rotational speed of the first sun gear S1 is made 0 by controlling the rotational speed of the first motor M1 so that the speed ratio γ0 of the differential portion 11 is fixed to a value smaller than "1", for example, approximately 0.7, the straight line L0 is set as shown in FIG. 3. Thus, the transmitting member 18 is rotated at the transmitting-member rotational speed $N_{18}$, which is higher than the engine speed $N_E$.

In the automatic shift portion 20, the fourth rotational element RE4 is selectively connected to the transmitting member 18 via the second clutch C2, and selectively connected to the case 12 via the first brake B1. The fifth rotational element RE5 is selectively connected to the case 12 via the second brake B2. The sixth rotational element RE6 is selectively connected to the case 12 via the third brake B3. The seventh rotational element RE7 is connected to the output shaft 22. The eighth rotational element RE8 is selectively connected to the transmitting member 18 via the first clutch C1.

When the straight line L0 matches the horizontal line X2 in the differential portion 11, and the rotational speed that is equal to the engine speed $N_E$ is input to the eighth rotational element RE8 from the differential portion 11, the rotational speed of the output shaft 22 at the first gear is indicated by the intersection of the oblique straight line L1 and the vertical line Y7 in the automatic shift portion 20, as shown in FIG. 3. The straight line L1 is set by engaging the first clutch C1 and the third brake B3. The straight line L1 passes through the intersection of the vertical line Y8 that indicates the rotational speed of the eighth rotational element RE8 and the horizontal line X2, and the intersection of the vertical line Y6 that indicates the rotational speed of the sixth rotational element RE6 and the horizontal line X1. The vertical line Y7 indicates the rotational speed of the seventh rotational element RE7 connected to the output shaft 22. Similarly, the rotational speed of the output shaft 22 at the second gear is indicated by the intersection of the oblique straight line L2 and the vertical line Y7. The straight line L2 is set by engaging the first clutch C1 and the second brake B2. The rotational speed of the output shaft 22 at the third gear is indicated by the intersection of the oblique straight line L3 and the vertical line Y7. The straight line L3 is set by engaging the first clutch C1 and the first brake B1. The rotational speed of the output shaft 22 at the fourth gear is indicated by the intersection of the horizontal straight line L4 and the vertical line Y7. The straight line L4 is set by engaging the first clutch C1 and the second clutch C2.

When the straight line L0 is set in the differential portion 11 as shown in FIG. 3, and the rotational speed higher than the engine speed $N_E$ is input to the eighth rotational element RE8 from the differential portion 11, the rotational speed of the output shaft 22 at the fifth gear is indicated by the intersection of the horizontal straight line L5 and the vertical line Y7. The straight line L5 is set by engaging the first clutch C1 and the second clutch C2.

Figure 4:
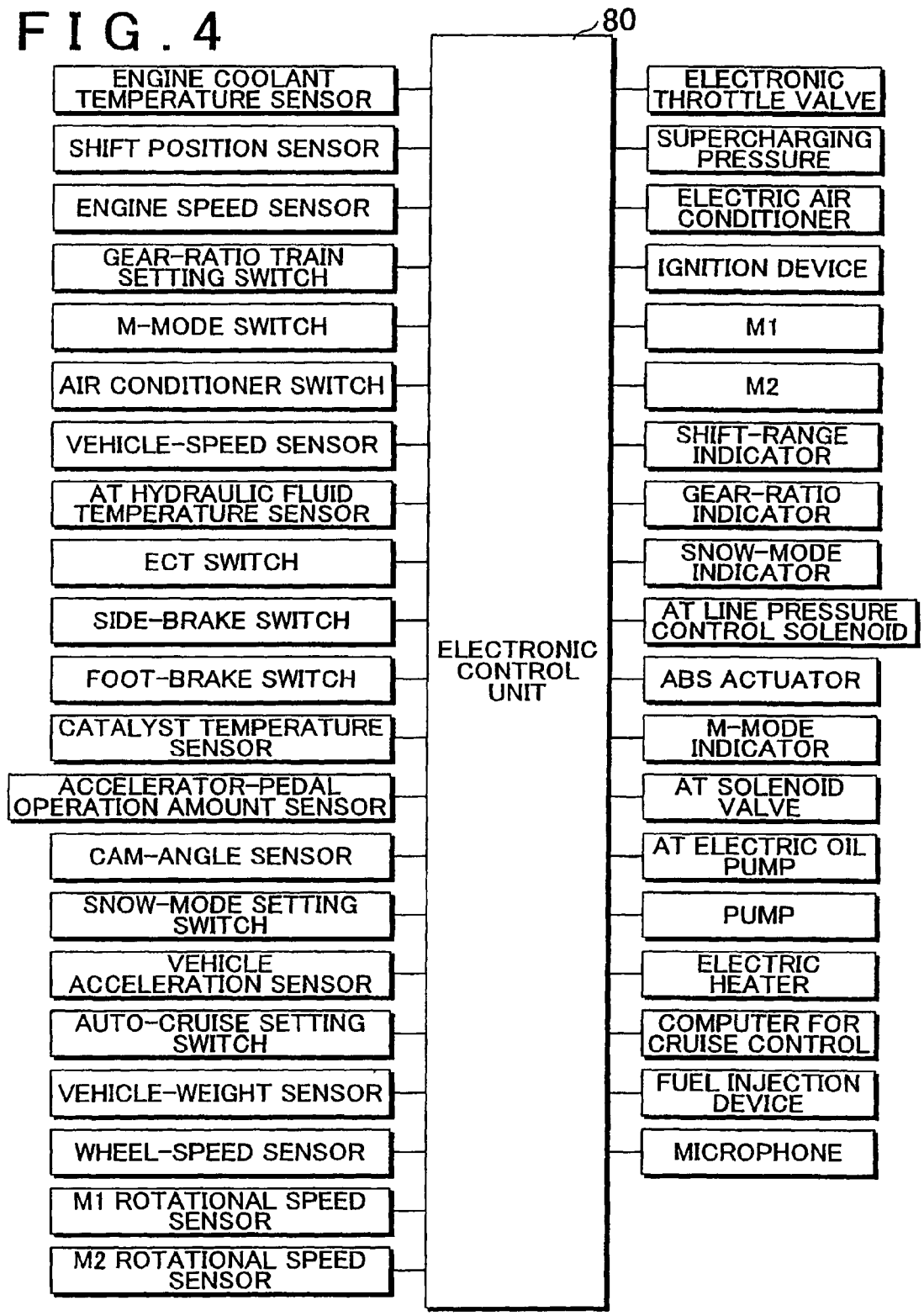
FIG. 4 is a diagram explaining signals input to and output from an electronic control unit provided in the drive apparatus in FIG. 1.

FIG. 4 shows signals that are input to an electronic control unit 80, and signals that are output from the electronic control unit 80 to control the shift mechanism 10 in the first embodiment. The electronic control unit 80 includes a so-called microcomputer that includes a CPU, ROM, RAM, and an input/output interface. The electronic control unit 80 executes a hybrid drive control relating to the engine 8, and the first and second motors M1 and M2, and a drive control including a shift control for the automatic shift portion 20, by processing the signals according to programs that are prestored in the ROM, using the temporary storage function of the RAM.

The electronic control unit 80 receives the signals from sensors and switches shown in FIG. 4. That is, the electronic control unit 80 receives a signal indicating an engine coolant temperature $T_{EMPW}$, a signal indicating a shift position $P_{SH}$ at which a shift lever 52 (refer to FIG. 6) is placed, a signal indicating the number of times that the shift lever 52 is operated at the position "M", a signal indicating the engine speed $N_E$ that is the rotational speed of the engine 8, a signal indicating a gear-ratio train set value, a signal providing an instruction for a manual mode (M-mode), a signal indicating the operation of an air conditioner, a signal indicating the vehicle speed V which depends on the rotational speed $N_{OUT}$ of the output shaft 22, a signal indicating the temperature $T_{OIL}$ of hydraulic oil in the automatic shift portion 20, a signal indicating the setting of a power mode (output from an ECT switch), a signal indicating the operation of an emergency brake, a signal indicating the operation of a foot brake, a signal indicating a catalyst temperature, a signal indicating the operation amount of an accelerator pedal (i.e., an accelerator-pedal operation amount Acc) which depends on the amount of output required by a driver, a signal indicating a cam angle, a signal indicating the setting of a snow mode, a signal indicating longitudinal acceleration G, a signal indicating an auto-cruise mode, a signal indicating the weight of the vehicle, a signal indicating the wheel speed of each wheel, a signal indicating the rotational speed $N_{M1}$ of the first motor M1 (hereinafter, referred to as "first-motor rotational speed $N_{M1}$"), a signal indicating the rotational speed $N_{M2}$ of the second motor M2 (hereinafter, referred to as "second-motor rotational speed $N_{M2}$", a signal indicating the state of charge SOC in an electric power storage device 56 (refer to FIG. 7), and the like.

The electronic control unit 80 outputs control signals to an engine output control device 58 (refer to FIG. 7) that controls the output from the engine 8. For example, the electronic control unit 80 outputs a drive signal to a throttle actuator 64 to control the throttle-valve opening amount $\theta_{TH}$ of an electronic throttle valve 62 provided in the intake pipe 60 of the engine 8, a fuel-supply amount signal that controls the amount of fuel supplied by a fuel injection device 66 to the intake pipe 60 or the cylinder of the engine 8, and an ignition signal that provides an instruction for the timing at which an ignition device 68 ignites the fuel in the engine 8. The electronic control unit 80 also outputs a supercharging-pressure adjustment signal that adjusts supercharging pressure, an electric air-conditioner drive signal that operates the electric air conditioner, an instruction signal that provides an instruction for the operation of the motors M1 and M2, a shift position (operational position) indication signal that operates a shift indicator, a gear-ratio indication signal that causes a gear-ratio indicator to indicate the gear ratio, a snow-mode indication signal that causes a snow-mode indicator to indicate that the snow mode is selected, an ABS operation signal that operates an ABS (anti-locking braking system) actuator that prevents the slip of the wheels at the time of braking, a M-mode indication signal that causes a M-mode indicator to indicate that the M-mode is selected, a valve-instruction signal that operates electromagnetic valves (linear solenoid valves) in a hydraulic control circuit 70 (refer to FIG. 5 and FIG. 7) to control hydraulic actuators for the hydraulic frictional engagement devices in the differential portion 11 and the automatic shift portion 20, a drive instruction signal that operates an electric hydraulic pump for supplying a hydraulic pressure that is used as a basic pressure when a line pressure $P_L$ is regulated using a regulator valve provided in the hydraulic control circuit 70, a signal that drives an electric heater, a signal for a computer used for the cruise control, and the like.

Figure 5:
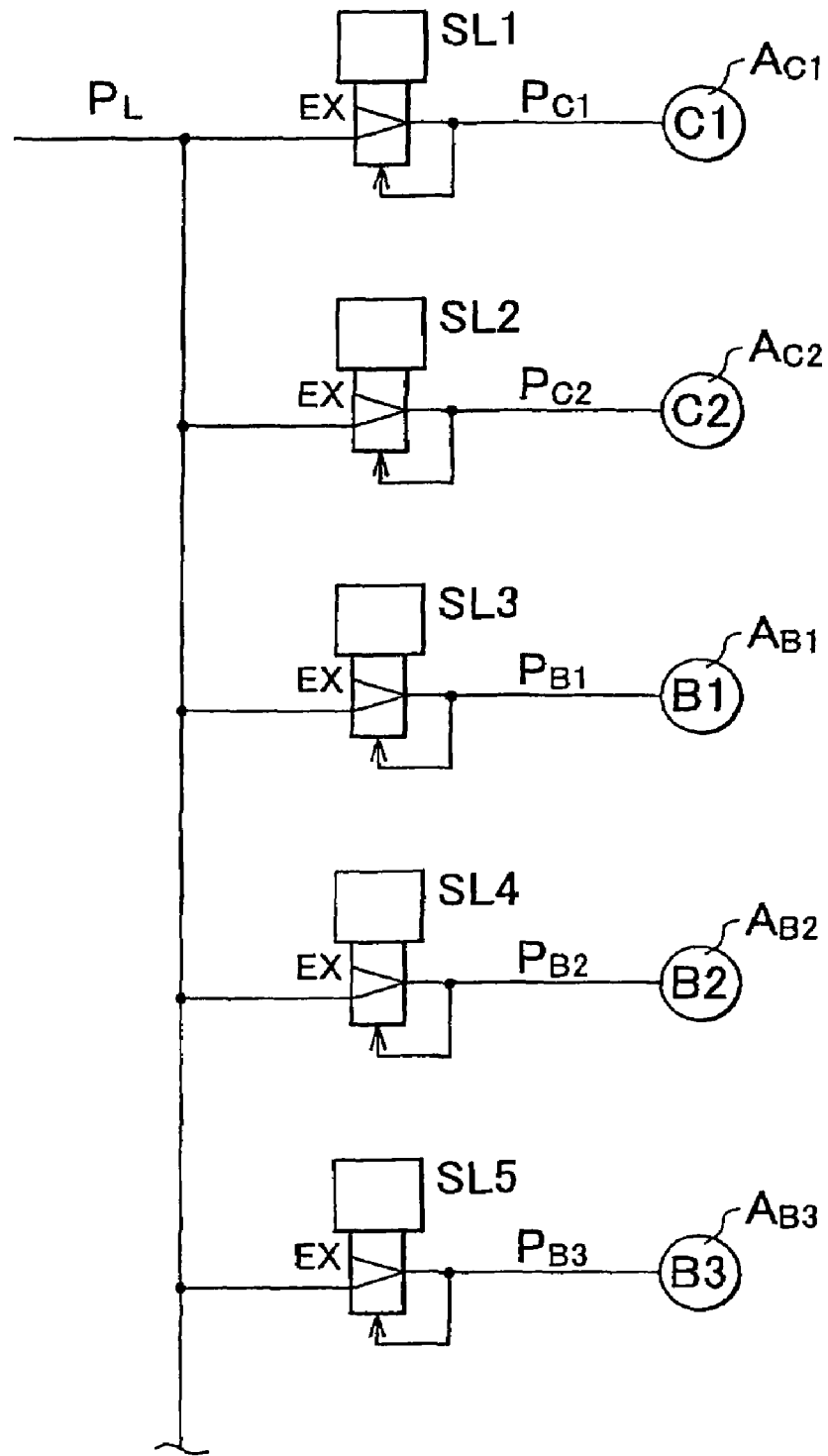
FIG. 5 is a circuit diagram relating to linear solenoid valves that control hydraulic actuators for clutches C1 and C2 and brakes B1 to B3, in a hydraulic control circuit.

FIG. 5 is a circuit diagram relating to linear solenoid valves SL1 to SL5 in the hydraulic control circuit 70. The linear solenoid valves SL1 to SL5 controls the operations of hydraulic actuators (hydraulic cylinders) $A_{C1}$, $A_{C2}$, $A_{B1}$, $A_{B2}$, and $A_{B3}$ for the clutches C1 and C2, and the brakes B1 to B3, respectively.

In FIG. 5, according to instruction signals from the electronic control unit 80, the linear solenoid valves SL1 to SL5 regulate engagement pressures $P_{C1}$, $P_{C2}$, $P_{B1}$, $P_{B2}$, and $P_{B3}$, respectively, using a line pressure PL. Then, the engagement pressures $P_{C1}$, $P_{C2}$, $P_{B1}$, $P_{B2}$, and $P_{B3}$ are directly supplied to the actuators $A_{C1}$, $A_{C2}$, $A_{B1}$, $A_{B2}$, and $A_{B3}$, respectively. For example, a relief regulator valve regulates the line pressure PL to a value according to an engine load or the like represented by the accelerator-pedal operation amount or a throttle-valve opening amount, using a hydraulic pressure generated by a mechanical oil pump rotated by an electric oil pump (not shown) or the engine 8, as a basic pressure.

The linear solenoid valves SL1 to SL5 basically have the same configuration. The electronic control unit 80 energizes/de-energizes the linear solenoid valves SL1 to SL5, independently. Thus, the hydraulic pressures for the hydraulic actuators $A_{C1}$, $A_{C2}$, $A_{B1}$, $A_{B2}$, and $A_{B3}$ are regulated independently. Accordingly, the engagement pressures $P_{C1}$, $P_{C2}$, $P_{B1}$, $P_{B2}$, and $P_{B3}$ for the clutches C1 to C4, and the brakes B1 and B2 are controlled independently. In the automatic shift portion 20, each gear is selected by engaging predetermined engagement devices, for example, as shown in the engagement operation table in FIG. 2. In the shift control for the automatic shift portion 20, for example, engagement and disengagement of the clutch C and the brake B relating to the shift are simultaneously controlled, that is, the so-called clutch-to-clutch shift is performed.

Figure 6:
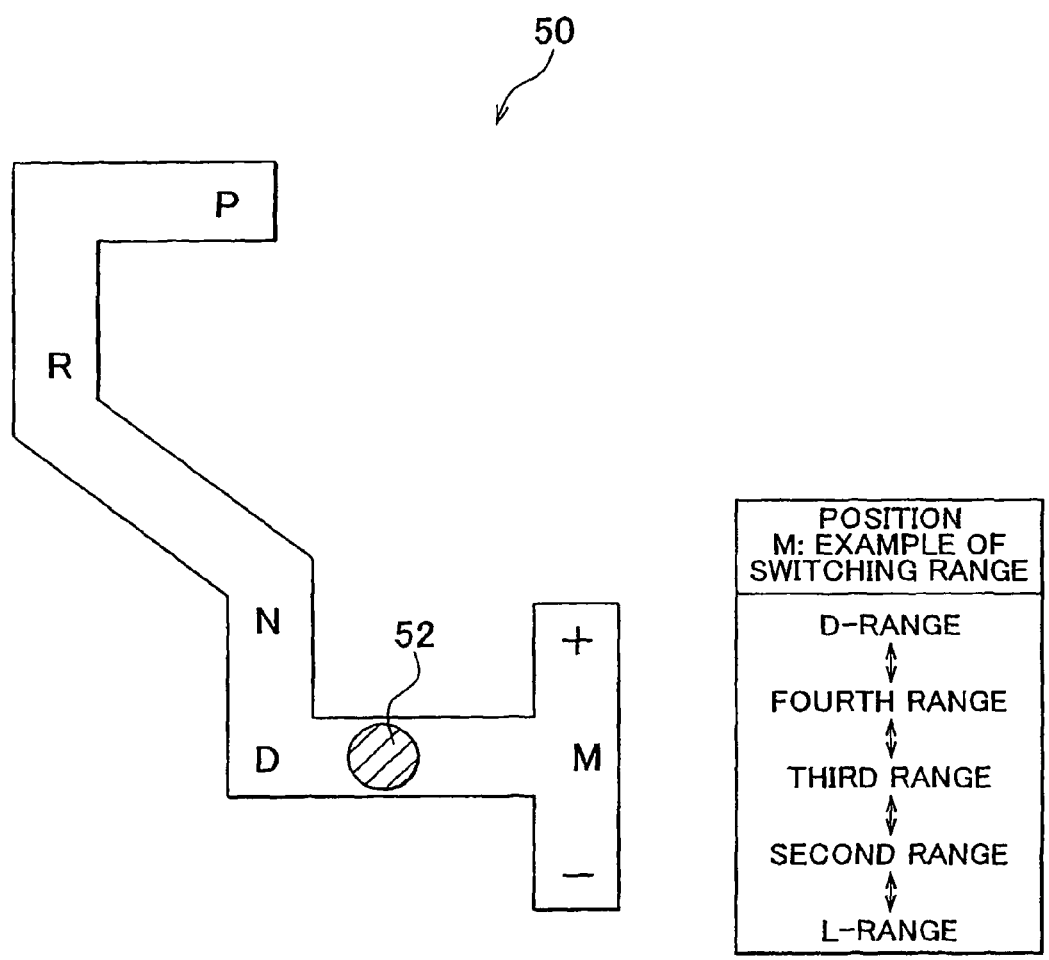
FIG. 6 shows an example of a shift operation device that includes a shift lever, and that is operated to select a shift position among a plurality of positions.

FIG. 6 is an example of a diagram showing a shift operation device 50. The shift operation device 50 is a switching device that switches the shift position $P_{SH}$ among a plurality of positions according to the operation performed by the driver. The shift operation device 50 is provided, for example, on the side of a driver's seat. The shift operation device 50 includes the shift lever 52 that is operated to select the shift position $P_{SH}$ among the plurality of positions.

The shift lever 52 is manually moved to one of a parking position "P (Parking)", a reverse position "R (Reverse)", a neutral position "N (Neutral)", an automatic-shift forward-running position "D (Drive)", and a manual-shift forward-running position "M (Manual)". When the shift lever 52 is at the position "P (Parking)", the transmission of power is interrupted in the power transmission path in the shift mechanism 10, that is, in the automatic shift portion 20 so that the shift mechanism 10 is in the neutral state, and the output shaft of the automatic shift portion 20 is locked. When the shift lever 52 is at the position "R (Reverse)", the vehicle backs up. When the shift lever 52 is at the position "N (Neutral)", the transmission of power is interrupted in the power transmission path in the shift mechanism 10 so that the shift mechanism 10 is placed in the neutral state. When the shift lever 52 is at the position "D (Drive)", an automatic shift control is executed to select the total speed ratio γT of the shift mechanism 10 in a range in which the total speed ratio γT can be changed. The total speed ratio γT is determined based on the speed ratio of the differential portion 11 and the speed ratio of the automatic shift portion 20 at each gear. The speed ratio of the differential portion 11 is continuously changed in a certain range. The gear of the automatic shift portion 20 is selected among the first gear to the fourth gear by the automatic shift control. When the shift lever 52 is at the position "M (Manual)", a manual shift mode (manual mode) is selected to set so-called shift ranges by restricting the use of the high gear(s) of the automatic shift portion 20 that is (are) used in the automatic shift control.

When the shift lever 52 is manually moved to the shift position $P_{SH}$ among the above-described positions, for example, the state of the hydraulic control circuit 70 is electrically switched to select one of the reverse gear "R", the neutral state "N", the gears in the forward gear "D", and the like shown in the engagement operation table in FIG. 2.

Among the positions "P" to "M", each of the positions "T" and "N" is a non-running position that is selected to stop the vehicle from running. When the shift lever 52 is at the position "P" or "N", for example, both of the first clutch C1 and the second clutch C2 are disengaged, as shown in the engagement operation table in FIG. 2. That is, each of the positions "P" and "N" is a non-dive position for switching the state of the power transmission path in the automatic shift portion 20 to the power-transmission interrupted state by disengaging the first clutch C1 and the second clutch C2 so that the transmission of the power is interrupted in the power transmission path and the vehicle cannot be driven. Each of the positions "R", "D", and "M" is a running position that is selected to cause the vehicle to run. When the shift lever 52 is at the position "R", "D", or "M", for example, at least one of the first clutch C1 and the second clutch C2 is engaged as shown in the engagement operation table in FIG. 2. That is, each of the positions "R", "D", and "M" is a drive position for switching the state of the power transmission path in the automatic shift portion 20 to the power-transmission permitted state by engaging the first clutch C1 and/or the second clutch C2 so that the transmission of power is permitted in the power transmission path and the vehicle can be driven.

More specifically, when the shift lever 52 is manually moved from the position "P" or "N" to the position "R", the state of the power transmission path in the automatic shift portion 20 is switched from the power-transmission interrupted state to the power-transmission permitted state by engaging the second clutch C2. When the shift lever 52 is manually moved from the position "N" to the position "D", the state of the power transmission path in the automatic shift portion 20 is switched from the power-transmission interrupted state to the power-transmission permitted state by engaging at least the first clutch C1. When the shift lever 52 is manually moved from the position "R" to the position "P" or "N", the state of the power transmission path in the automatic shift portion 20 is switched from the power-transmission permitted state to the power-transmission interrupted state by disengaging the second clutch C2. When the shift lever 52 is manually moved from the position "D" to the position "N", the state of the power transmission path in the automatic shift portion 20 is switched from the power-transmission permitted state to the power-transmission interrupted state by disengaging the first clutch C1 and the second clutch C2.

Figure 7:
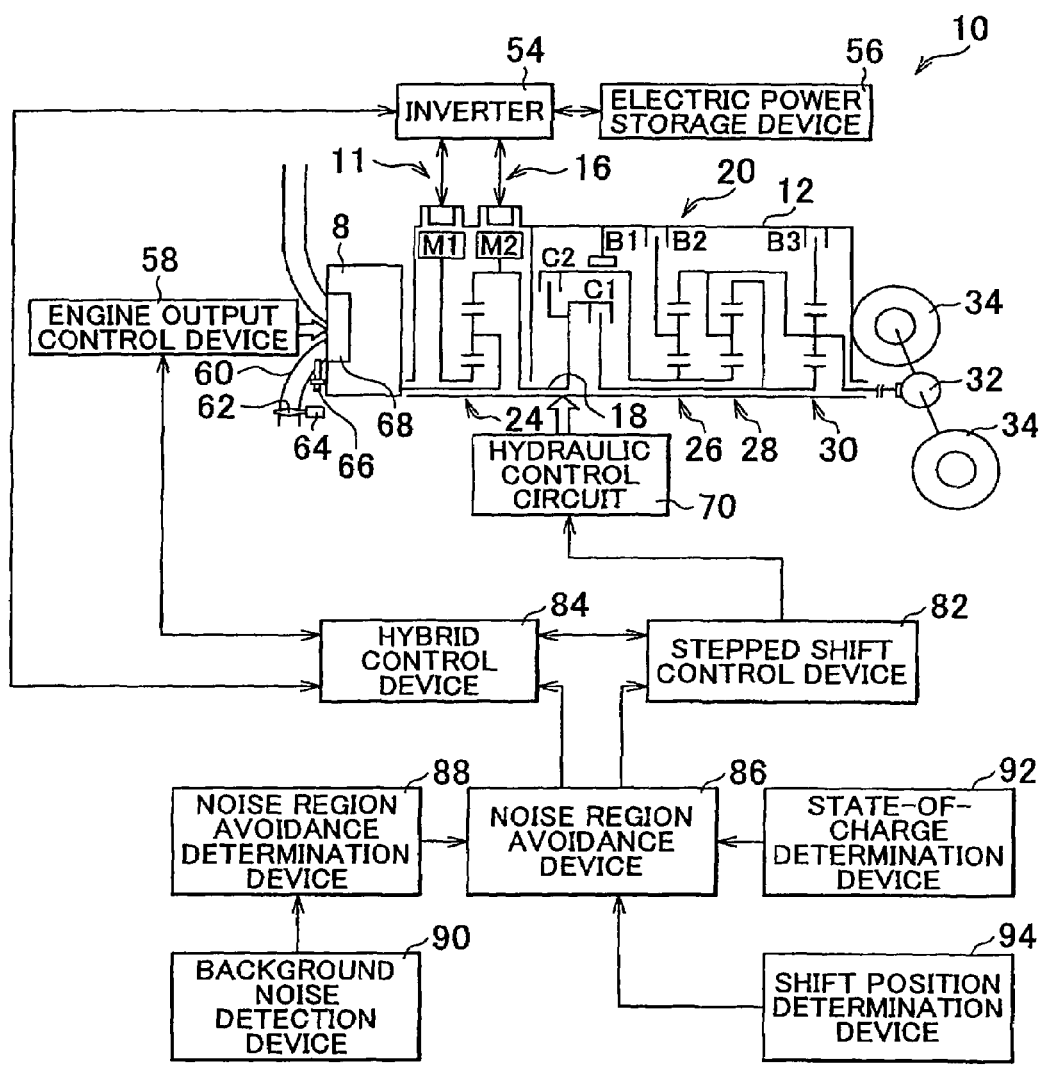
FIG. 7 is a function block diagram explaining the main part of a control operation performed by the electronic control unit in FIG. 4.
Figure 8:
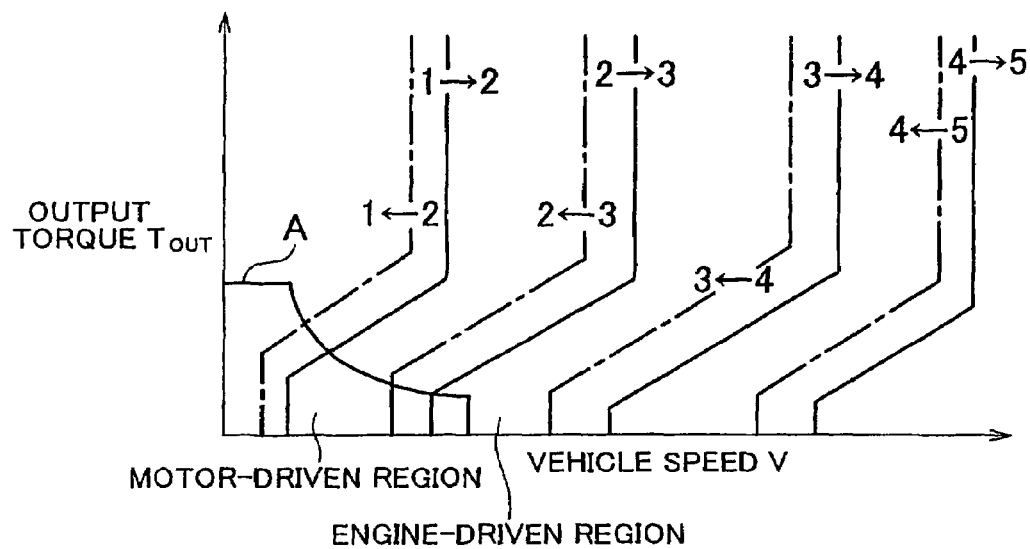
FIG. 8 shows an example of a shift map used in a shift control for the drive apparatus, and an example of a driving power source switching map used in a driving power source switching control that switches a drive mode between an engine-driven mode and a motor-driven mode, and FIG. 8 also shows the relation between the shift map and the driving power source switching map.

FIG. 7 is a function block diagram explaining the main part of the control operation performed by the electronic control unit 80. In FIG. 7, a stepped shift control device 82 determines whether the automatic shift portion 20 should shift, based on the vehicle condition indicated by the actual vehicle speed V and a required torque $T_{OUT}$ output from the automatic shift portion 20, using a prestored shift diagram (i.e., a shift relation, or a shift map) in which the vehicle speed V and the output torque $T_{OUT}$ are used as parameters, and upshift lines (solid lines) and downshift lines (chain lines) are provided, as shown in FIG. 8. That is, the stepped shift control device 82 determines the gear to which the automatic shift portion 20 should shift, based on the vehicle condition, using the shift diagram. Then, the stepped shift control device 82 executes an automatic shift control so that the automatic shift portion 20 shifts to the determined gear.

At this time, the stepped shift control device 82 provides the instruction (i.e., an instruction for output for shift, or a hydraulic pressure instruction) to the hydraulic control circuit 70 to engage and/or disengage the hydraulic frictional engagement devices relating to the shift of the automatic shift portion 20 so that the automatic shift portion 20 shifts to the determined gear according to, for example, the engagement operation table shown in FIG. 2. That is, the stepped shift control device 82 outputs the instruction to the hydraulic control circuit 70 to disengage the disengagement-side engagement device relating to the shift of the automatic shift portion 20, and to engage the engagement-side engagement device relating to the shift of the automatic shift portion 20, thereby performing the clutch-to-clutch shift. According to the instruction, for example, the hydraulic control circuit 70 operates the hydraulic actuators for the hydraulic frictional engagement devices relating to the shift by operating the linear solenoid valves SL in the hydraulic control circuit 70. Thus, the disengagement-side engagement device relating to the shift is disengaged, and the engagement-side engagement device relating to the shift is engaged so that the automatic shift portion 20 shifts to the determined gear.

A hybrid control device 84 operates the engine 8 efficiently, and controls the speed ratio γ0 of the differential portion 11 that functions as the electric CVT, by optimizing the ratio between the driving power provided by the engine 8 and the driving power provided by the second motor M2, and optimizing the reaction force borne by the first motor M1 while the first motor M1 generates electric power. For example, the hybrid control device 84 calculates a target (required) output for driving the vehicle based on the accelerator-pedal operation amount Acc, which indicates the amount of output required by the driver, and the vehicle speed V; calculates a total target output based on the target output for driving the vehicle and a required output for charging the electric power storage device 56; calculates a target engine output so that the total target output can be obtained, taking into account a transfer loss, loads of auxiliary machines, an assist torque provided by the second motor M2, and the like; and controls the engine speed $N_E$ and the engine torque $T_E$ of the engine 8 to obtain the engine output that matches the target engine output, and controls the amount of electric power generated by the first motor M1.

For example, the hybrid control device 84 executes the hybrid control to improve the power performance, the fuel efficiency, and the like, taking into account the gear of the automatic shift portion 20. During this hybrid control, the differential portion 11 functions as the electric CVT to coordinate the engine speed $N_E$ and the vehicle speed V, which are set to operate the engine 8 efficiently, and the rotational speed of the transmitting member 18, which is set by the gear of the automatic shift portion 20. That is, the hybrid control device 84 sets the target value of the total speed ratio γT of the shift mechanism 10 so that the engine 8 operates according to an optimum fuel efficiency curve (i.e., a fuel efficiency map, a relational diagram) as indicated by the dash line in FIG. 9. The optimum fuel efficiency curve is empirically obtained in advance in a two-dimension coordinate constituted by the engine speed $N_E$ and the torque $T_E$ output from the engine 8 (i.e., engine torque $T_E$) so that high driveability and high fuel efficiency are achieved when the vehicle is driven in the CVT mode. The optimum fuel efficiency curve is stored. For example, the hybrid control device 84 sets the target value of the total speed ratio γT of the shift mechanism 10 to control the engine torque $T_E$ and the engine speed $N_E$ to obtain the engine output that matches the target output (i.e., the total target output, or the required driving power). Then, the hybrid control device 84 controls the speed ratio γ0 of the differential portion 11, taking into the account the gear of the automatic shift portion 20, thereby controlling the total speed ratio γT in a range in which the total speed ratio γT can be changed. Thus, the operating point of the engine 8, the operating points of the first motor M1 and the second motor M2, and the speed ratio γ of the automatic shift portion 20 are set based on the characteristic of the shift mechanism 10, for example, the system efficiency of the shift mechanism 10.

At this time, the hybrid control device 84 supplies the electric energy generated by the first motor M1 to the electric power storage device 56 and the second motor M2 through an inverter 54. Therefore, although a large part of the power output from the engine 8 is mechanically transmitted to the transmitting member 18, part of the power output from the engine 8 is consumed by the first motor M1 to generate electric power. That is, part of the power output from the engine 8 is converted to electric energy in the first motor M1. The electric energy is supplied to the second motor M2 through the inverter 54, and the second motor M2 is driven. Thus, mechanical energy is transmitted from the second motor M2 to the transmitting member 18. The devices related to the process from the generation of the electric power to the consumption of the electric power in the second motor M2 constitute an electric path in which part of the power output from the engine 8 is converted to the electric energy, and the electric energy is converted to the mechanical energy.

The hybrid control device 84 can maintain the engine speed $N_E$ at a substantially constant value, or control the engine speed $N_E$ to any given value by using the electric CVT function of the differential portion 11 to control the first-motor rotational speed $N_{M1}$ and/or the second-motor rotational speed $N_{M2}$, regardless of whether the vehicle is stopped or driven. In other words, the hybrid control device 84 can control the first-motor rotational speed $N_{M1}$ and/or the second-motor rotational speed $N_{M2}$ to any given value(s), while maintaining the engine speed $N_E$ at a substantially constant value, or controlling the engine speed $N_E$ to any given value.

For example, as shown in the collinear diagram in FIG. 3, when the engine speed $N_E$ needs to be increased while the vehicle is driven, the hybrid control device 84 increases the first-motor rotational speed $N_{M1}$ while maintaining the second-motor rotational speed $N_{M2}$, which depends on the vehicle speed V (the rotational speed of drive wheels 34), to a substantially constant value. When the engine speed $N_E$ needs to be maintained at a substantially constant value during the shift of the automatic shift portion 20, the hybrid control device 84 increases the first-motor rotational speed $N_{M1}$ if the second-motor rotational speed $N_{M2}$ is decreased by the shift of the automatic shift portion 20 and the change in the vehicle speed V, and decreases the first-motor rotational speed $N_{M1}$ if the second-motor rotational speed $N_{M2}$ is increased by the shift of the automatic shift portion 20 and the change in the vehicle speed V, while maintaining the engine speed $N_E$ at a substantially constant value.

Also, the hybrid control device 84 has a function of executing an output control for the engine 8 so that the engine 8 generates the required output, by outputting at least one of the instruction for controlling opening/closing of the electronic throttle valve 62 using the throttle actuator 64, the instruction for controlling the amount of fuel injected by the fuel injection device 66, and the timing at which fuel is injected by the fuel injection device 66, and the instruction for controlling the timing at which the fuel is ignited by the ignition device 68 such as the igniter, to the engine output control device 58.

For example, the hybrid control device 84 basically executes a throttle control to drive the throttle actuator 64 based on the accelerator-pedal operation amount Acc according to a prestored relation (not shown). That is, the hybrid control device 84 basically executes the throttle control to increase the throttle-valve opening amount $θ_{TH}$ as the accelerator-pedal operation amount Acc increases. The engine output control device 58 controls the engine torque, for example, by controlling the opening/closing of the electronic throttle valve 62 using the throttle actuator 64, controlling the fuel injection performed by the fuel injection device 66, and controlling the timing at which the fuel is ignited by the ignition device 68 such as the igniter, according to the instruction provided by the hybrid control device 84.

Also, the hybrid control device 84 can drive the vehicle in a motor-driven mode, using the electric CVT function (differential action) of the differential portion 11, regardless of whether the engine 8 is stopped or idling.

For example, the hybrid control device 84 determines whether the vehicle condition is in the motor-driven region or the engine-driven region, based on the vehicle condition indicated by the actual vehicle speed V and the required torque $T_{OUT}$ output from the automatic shift portion 20, using a prestored relational diagram (a driving power source switching diagram, a driving power source map) as shown in FIG. 8. In the relational diagram, the vehicle speed V and the required torque $T_{OUT}$ output from the automatic shift portion 20 are used as parameters. The relational diagram shown in FIG. 8 includes a boundary line between the engine-driven region and the motor-driven region, which is provided to switch the driving power source for starting and driving the vehicle between the engine 8 and the second motor M2. Then, the hybrid control device 84 drives the vehicle in the motor-driven mode or the engine-driven mode. For example, the driving power source switching diagram indicated by the solid line A in FIG. 8 is prestored, along with the shift map indicated by the solid lines and chain lines in FIG. 8. As evident from FIG. 8, for example, the hybrid control device 84 drives the vehicle in the motor-driven mode in a low output torque $T_{OUT}$ region, that is, in a low engine torque $T_E$ region where the engine efficiency is generally lower than that in a high torque region, or in a low vehicle speed region where the vehicle speed V is low, that is, a low load region.

When the vehicle is driven in the motor-driven mode, the hybrid control device 84 executes the control to suppress the drag of the engine 8 that is stopped, and to improve fuel efficiency. That is, when the vehicle is driven in the motor-driven mode, the hybrid control device 84 controls the first motor M1 so that the first-motor rotational speed $N_{M1}$ is a negative value, for example, the hybrid control device 84 places the first motor M1 in a no-load state so that the first motor M1 is idling, thereby maintaining the engine speed $N_E$ at zero or substantially zero using the electric CVT function (differential action) of the differential portion 11, as required.

Even when the vehicle is driven in the engine-driven mode, the hybrid control device 84 can perform a so-called torque-assist operation to assist the engine 8, by supplying the electric energy to the second motor M2 from the first motor M1 via the electric path, and/or from the electric power storage device 56, and by driving the second motor M2 to apply torque to the drive wheels 34.

Also, the hybrid control device 84 can place the first motor M1 in a no-load state to permit the first motor M1 to idle. In this case, torque cannot be transmitted in the differential portion 11, that is, the transmission of power is substantially interrupted in the power transmission path in the differential portion 11, and no output is generated from the differential portion 11. That is, the hybrid control device 84 can place the differential portion 11 in the neutral state so that the transmission of power is electrically interrupted in the power transmission path in the differential portion 11, by placing the first motor M1 in the no-load state.

In the shift mechanism 10, noise occurs due to the rotation of the first motor M1 and the second motor M2 when a power running control or a power-generation control is executed, or gear noise occurs due to engagement of the gears in the first planetary gear unit 24, the second planetary gear unit 26, the third planetary gear unit 28, and the fourth planetary gear unit 30, which are engaged with each other to transmit power. Each of the motor noise and the gear noise has a peak value in a specific frequency band. The motor noise and/or the gear noise may noticeably occur at a specific operating point of the engine 8 and/or a specific operating point of the motor M. Hereinafter, the motor noise and/or the gear noise may be simply referred to as "noise".

Figure 10:
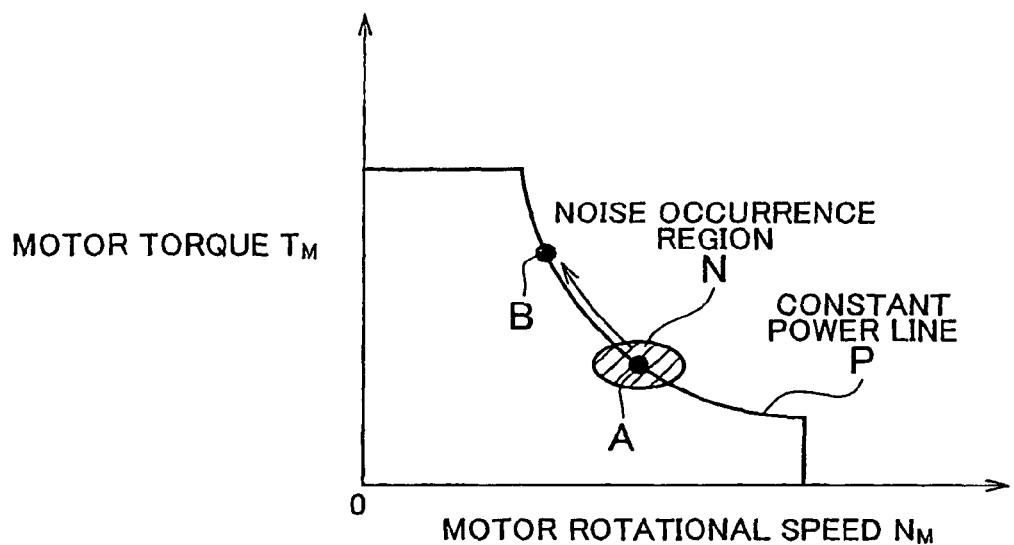
FIG. 10 is an example of a motor map which is empirically defined and stored in advance, and in which a motor rotational speed and motor torque are used as parameters, the curve P is an example of a constant power line P showing the constant value of power output from a motor, the point A is an example of the operating point of the motor, which is set based on driving efficiency of the motor, and the hatched circle portion N is an example of a noise occurrence region.

FIG. 10 is a diagram showing an example of a motor characteristic (motor map) that is empirically defined and stored in advance. In the motor map, the motor rotational speed $N_M$ and the motor torque $T_M$ are used as parameters. In FIG. 10, the curve P is an example of a constant power line P showing the constant value of power output from the motor M. The point A is an example of the operating point of the motor M, which is set based on the driving efficiency of the motor M, and which is defined by the motor rotational speed $N_M$ and the motor torque $T_M$. The hatched circle portion N is an example of a noise occurrence region N where noise noticeably occurs. The noise occurrence region N is empirically defined and stored in advance.

Figure 9:
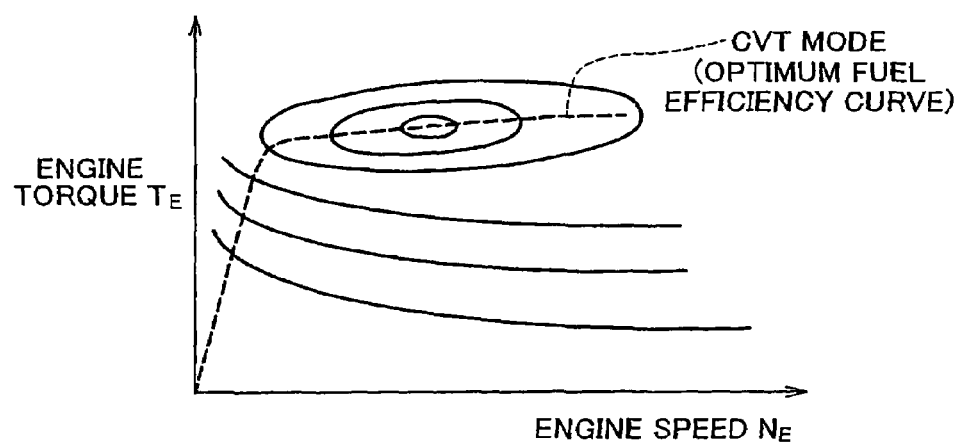
FIG. 9 shows an example of a fuel efficiency map in which a dash line is an optimum fuel efficiency curve.
Figure 11:
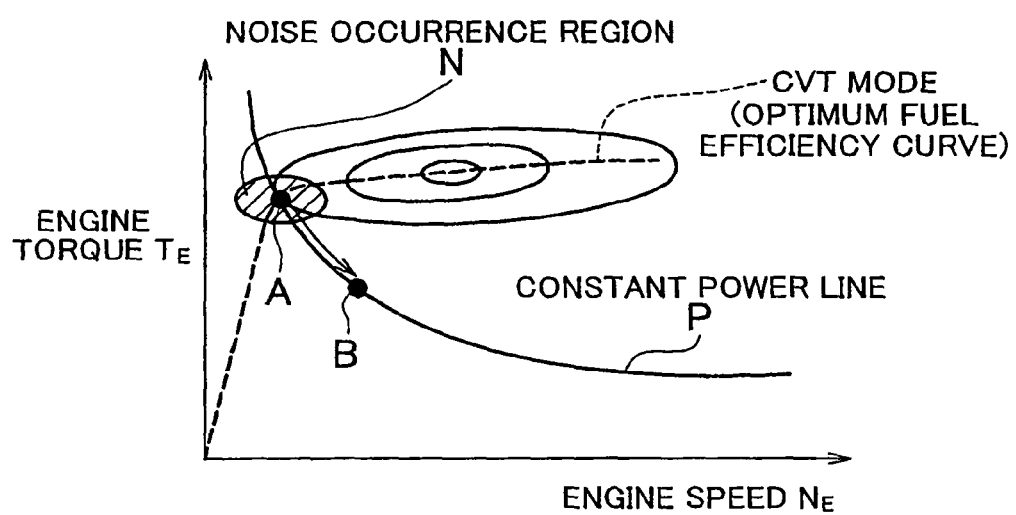
FIG. 11 is a fuel efficiency map which is the same as the fuel efficiency map in FIG. 9, and in which the curve P is an example of a constant power line P showing the constant value of power output from the engine, the point A is an example of the operating point of the engine, which is set based on the fuel efficiency of the engine, and the hatched circle portion N is an example of the noise occurrence region.

FIG. 11 is the same as the fuel efficiency map shown in FIG. 9. The curve P is an example of a constant power line P showing the constant value of power output from the engine 8. The point A is an example of the operating point of the engine 8, which is set based on the fuel efficiency (optimum fuel efficiency) of the engine 8, and which is defined by the engine speed $N_E$ and the engine torque $T_E$. The hatched circle portion N is an example of the noise occurrence region N.

As shown in FIGS. 10 and 11, the operating point of the motor M and/or the operating point of the engine 8, which are/is set based on the characteristic of the shift mechanism 10, for example, the system efficiency of the shift mechanism 10, may be in the noise occurrence region N. An occupant may feel discomfort or the like due to such noise, depending on the level of the noise. Thus, it is desired to minimize the level of the noise even if the system efficiency is slightly decreased, taking into account the increased demand for reducing noise, and the adverse effect of noise on comfort of the occupant.

Accordingly, in the first embodiment, a noise region avoidance device 86 is provided. When the operating point of the motor M is in the noise occurrence region N, the noise region avoidance device 86 changes the operating point of the motor M so that the operating point of the motor M avoids the noise occurrence region N. When the operating point of the engine 8 is in the noise occurrence region N, the noise region avoidance device 86 also changes the operating point of the engine 8 so that the operating point of the engine 8 avoids the noise occurrence region N.

For example, the operating point of the motor M is changed from the operating point A to the operating point B on the constant power line P in FIG. 10 so that the operating point A avoids the noise occurrence region N, by changing the motor rotational speed $N_M$ and the motor torque $T_M$. Also, for example, the operating point of the engine 8 is changed from the operating point A to the operating point B on the constant power line P in FIG. 11 so that the operating point A avoids the noise occurrence region N, by changing the engine speed $N_E$ and the engine torque $T_E$. Thus, the noise occurrence region N can be avoided while the required power continues to be provided.

Hereinafter, specific devices that changes the operating points of the first motor M1, the second motor M2, and the engine 8 will be described in detail.

For example, the noise region avoidance device 86 outputs an operating point change command V to the hybrid control device 84 to change the operating point of the first motor M1 and the operating point of the engine 8 so that the operating point of the first motor M1 and the operating point of the engine 8 avoid the respective noise occurrence regions N, by controlling the first motor M1 using the differential action of the differential portion 11 to change the first-motor rotational speed $N_{M1}$, and to change the engine speed $N_E$. That is, the operating point change command V is output to change the operating point of the first motor M1 and the operating point of the engine 8 by changing only the speed ratio γ0 of the differential portion 11.

Also, because the shift mechanism 10 includes the automatic shift portion 20, the noise region avoidance device 86 outputs an operating point change command X to the stepped shift control device 82 to change the operating point of the second motor M2 so that the operating point of the second motor M2 avoids the noise occurrence region N, by executing the shift control for the automatic shift portion 20 to change the second-motor rotational speed $N_{M2}$. That is, the operating point change command X is output to change the operating point of the second motor M2 by changing the speed ratio γ of the automatic shift portion 20. When the operating point change command X is output, the first-motor rotational speed $N_{M1}$ and the engine speed $N_E$ are also changed at the same time, and thus, the operating point of the first motor M1 and the operating point of the engine 8 are also changed.

However, when the speed ratio γ0 of the differential portion 11 is changed in addition to outputting the operating point change command X, one of the first-motor rotational speed $N_{M1}$ and the engine speed $N_E$ may not be changed, and thus, one of the operating point of the first motor M1 and the operating point of the engine 8 may not be changed.

For example, in addition to outputting the operating point change command X to the stepped shift control device 82, the noise region avoidance device 86 outputs an operating point change command Y to the hybrid control device 84 to change the operating point of the first motor M1 so that the operating point of the first motor M1 avoids the noise occurrence region N while the operating point of the engine 8 is unchanged, by controlling the first motor M1 to change the first-motor rotational speed $N_{M1}$ while the engine speed $N_E$ is maintained at a substantially constant value. That is, the operating point change command Y is output to change the operating point of the first motor M1 while the operating point of the engine 8 is unchanged to achieve the optimum fuel efficiency, by changing the speed ratio γ0 of the differential portion 11 in accordance with the change in the speed ratio γ of the automatic shift portion 20 so that the total speed ratio γT is unchanged.

Also, in addition to outputting the operating point change command X to the stepped shift control device 82, the noise region avoidance device 86 outputs an operating point change command Z to the hybrid control device 84 to change the operating point of the engine 8 so that the operating point of the engine 8 avoids the noise occurrence region N while the operating point of the first motor M1 is unchanged, by controlling the first motor M1 to maintain the first-motor rotational speed $N_{M1}$ at a substantially constant value, and controlling the engine to change the engine speed $N_E$. That is, the operating point change command Z is output to change the operating point of the engine 8 by changing the speed ratio γ0 of the differential portion 11 in accordance with the change in the speed ratio γ of the automatic shift portion 20 so that the operating point of the first motor M1 is unchanged.

Thus, in the first embodiment, when the operating point of the motor M or the operating point of the engine 8 is in the noise occurrence region N, the operating point of the motor M or the operating point of the engine 8 is changed so that the operating point of the motor M or the operating point of the engine 8 avoids the noise occurrence region N. However, even if the operating point of the motor M or the operating point of the engine 8 is in the noise occurrence region N, the operating point of the motor M or the operating point of the engine 8 does not need to be changed in some cases, that is, the noise occurrence region N does not need to be avoided in some cases. Therefore, it may be disadvantageous for the system efficiency to constantly avoid the noise occurrence region N.

Accordingly, a noise region avoidance determination device 88 is further provided. The noise region avoidance determination device 88 determines whether the noise occurrence region N needs to be avoided. The noise region avoidance device 86 may execute the avoidance control for avoiding the noise occurrence region N when the noise region avoidance determination device 88 determines that the noise occurrence region N needs to be avoided. In this case, the deterioration of the system efficiency is suppressed, as compared to the case where the noise occurrence region N is constantly avoided.

Figure 12:
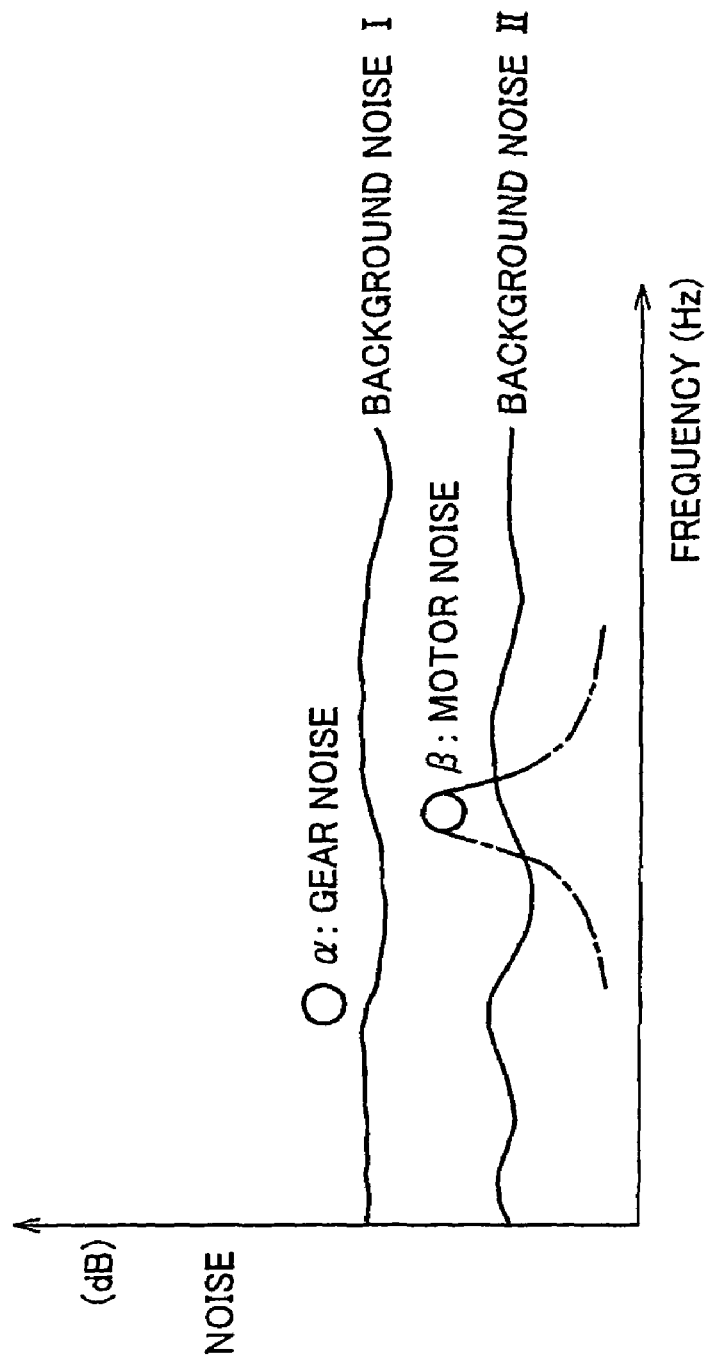
FIG. 12 is a diagram explaining a case where the level of noise is compared with the level of background noise, as an example where it is determined whether the noise occurrence region N needs to be avoided.

FIG. 12 is a diagram explaining a case where the level of the noise is compared with the level of the background noise, as an example where it is determined whether the noise occurrence region N needs to be avoided. The circle α indicates the level of the gear noise in a gear noise occurrence region. The circle β indicates the level of the motor noise in a motor noise occurrence region. The chain line indicates a frequency-motor noise characteristic. The circle β also indicates the above-described peak value in the specific frequency band.

When the noise is lost in the background noise as shown by the relation between the motor noise shown by the circle β and background noise I in FIG. 12, or when the level of the noise is higher than the level of the background noise by only a small amount, the noise is unnoticeable, that is, the level of the noise is not significantly higher than the level of the background noise, and therefore, the noise occurrence region N does not need to be avoided. In contrast, when the noise is not lost in the background noise as shown by the relation between the gear noise shown by the circle α and the background noise I/II, or the relation between the motor noise shown by the circle β and the background noise II in FIG. 12, or when the level of the noise is higher than the level of the background noise by an amount greater than a predetermined amount, the noise is noticeable, that is, the level of the noise is significantly higher than the level of the background noise, and therefore, the noise occurrence region N needs to be avoided.

The above-described background noise may include, for example, noise relating to the operation of an air conditioner (hereinafter, referred to as "air conditioner noise"), noise relating to the operation of an audio system (hereinafter, referred to as "audio system noise"), noise relating to the operation of the engine (hereinafter, referred to as "engine noise"), noise relating to opening/closing of a window, and road noise.

More specifically, a background noise detection device 90 detects or estimates the level of the background noise. For example, when the vehicle runs at a constant speed such that the operating points are not in the noise occurrence region N, the background noise detection device 90 detects the actual level of the background noise using a microphone (refer to FIG. 4) or the like, as needed. Alternatively, the background noise detection device 90 estimates the level of the background noise as needed, by estimating the level of the air conditioner noise based on a signal indicating the operation of an air conditioner, a drive signal for the electric air conditioner, and the like, according to a relation between the signal relating to the operation of the air conditioner and the air conditioner noise (i.e., an air conditioner noise map), which is empirically defined and stored in advance; estimating the level of the audio system noise based on a signal indicating the on/off state of an audio system switch, a signal for adjusting the sound volume of a speaker, and the like, according to a relation between the signal relating to the operation of the audio system and the audio noise (i.e., an audio system noise map), which is empirically defined and stored in advance; and estimating the level of the engine noise based on a signal indicating the on/off state of the engine, the engine speed $N_E$, and the like, according to a relation between the signal relating to the operation of the engine and the engine noise (i.e., an engine noise operation map), which is empirically defined and stored in advance.

The noise region avoidance determination device 88 estimates the level of the noise based on an actual vehicle condition, according to a relation between the vehicle condition (for example, the operating point of the engine 8 and the operating point of the motor M), and the level of the noise (i.e., a noise map), which is empirically defined and stored in advance. In addition, the noise region avoidance determination device 88 determines whether the estimated level of the noise is significantly higher than the level of the background noise detected or estimated by the background noise detection device 90, according to a determination criterion that is empirically defined and set. Then, the noise region avoidance determination device 88 determines whether the noise occurrence region N needs to be avoided based on the result of the determination.

The noise region avoidance determination device 88 may determine that the noise occurrence region N needs to be avoided, when the level of the noise remains significantly higher than the level of the background noise for a predetermined period T. This prevents the noise region avoidance device 86 from repeatedly executing and stopping the avoidance control for avoiding the noise occurrence region N in a short period. The predetermined period T is a determination period T that is empirically set and stored in advance. The predetermined period T is used to reliably determine that the level of the noise is significantly higher than the level of the background noise. For example, when the level of the noise is higher than the level of the background noise by at least a predetermined value, that is, when the level of the noise is equal to or above a value obtained by adding the predetermined value to the level of the background noise, the level of the noise is significantly higher than the level of the background noise. The predetermined value is empirically set in advance, and used to determine that the level of the noise is significantly higher than the level of the background noise.

The noise region avoidance device 86 may execute the avoidance control for avoiding the noise occurrence when the vehicle is in the vehicle condition where the decrease in the system efficiency is permitted. For example, a state-of-charge determination device 92 that determines whether the state of charge SOC of the electric power storage device 56 exceeds a predetermined value Q may be provided, and the noise region avoidance device 86 may execute the avoidance control for avoiding the noise occurrence region N when the state-of-charge determination device 92 determines that the state of charge SOC exceeds the predetermined value Q. The predetermined value Q is a determination value that is empirically set and stored in advance. The predetermined value Q is used to determine whether there is a sufficient amount of electric power for the second motor M2 to output sufficient torque even if power-generation efficiency and charging efficiency are decreased, or the electric power storage device 56 is not charged with electric power, for example, when the vehicle is driven in the motor-driven mode, or when the second motor M2 assists the engine 8. When the state of charge SOC exceeds the predetermined value Q, and thus, the second motor M2 can be driven without trouble, the vehicle is in the vehicle condition where the decrease in the system efficiency is permitted.

However, even when the state of charge SOC of the electric power storage device 56 is equal to or below the predetermined value Q, the noise region avoidance device 86 may execute the avoidance control for avoiding the noise occurrence region N, if the shift lever 52 is at the position "P". This is because consideration does not need to be given to driving of the motor M2 when the shift lever 52 is at the position "P". Also, the noise occurrence region N needs to be avoided when the shift lever 52 is at the position "P", and the state of charge SOC is equal to or below the predetermined value Q, and therefore the electric power storage device 56 is charged with electric power generated by the first motor M1 operated by the power of the engine 8. Accordingly, when the shift lever 52 is at the running position such as the position "D" or the position "R", the noise occurrence region N is avoided on the condition that the state of charge SOC exceeds the predetermined value Q. When the shift lever 52 is at the position "P", the noise occurrence region N is avoided even if the state of charge SOC is equal to or below the predetermined value Q.

That is, a shift position determination device 94 is provided. The shift position determination device 94 determines whether the shift lever 52 is at a predetermined position, based on the signal indicating the shift position $P_{SH}$ at which the shift lever 52 is placed. The noise region avoidance device 86 executes the avoidance control for avoiding the noise occurrence region N in a manner in accordance with the predetermined position. For example, when the shift position determination device 94 determines that the shift lever 52 is at the position "D" as the predetermined position, the noise region avoidance device 86 executes the avoidance control for avoiding the noise occurrence region N on the condition that the state-of-charge determination device 92 determines that the state of charge SOC exceeds the predetermined value Q. When the shift position determination device 94 determines that the shift lever 52 is at the position "P" as the predetermined position, the noise region avoidance device 86 executes the avoidance control for avoiding the noise occurrence region N, regardless of the result of the determination made by the state-of-charge determination device 92.

Figure 13:
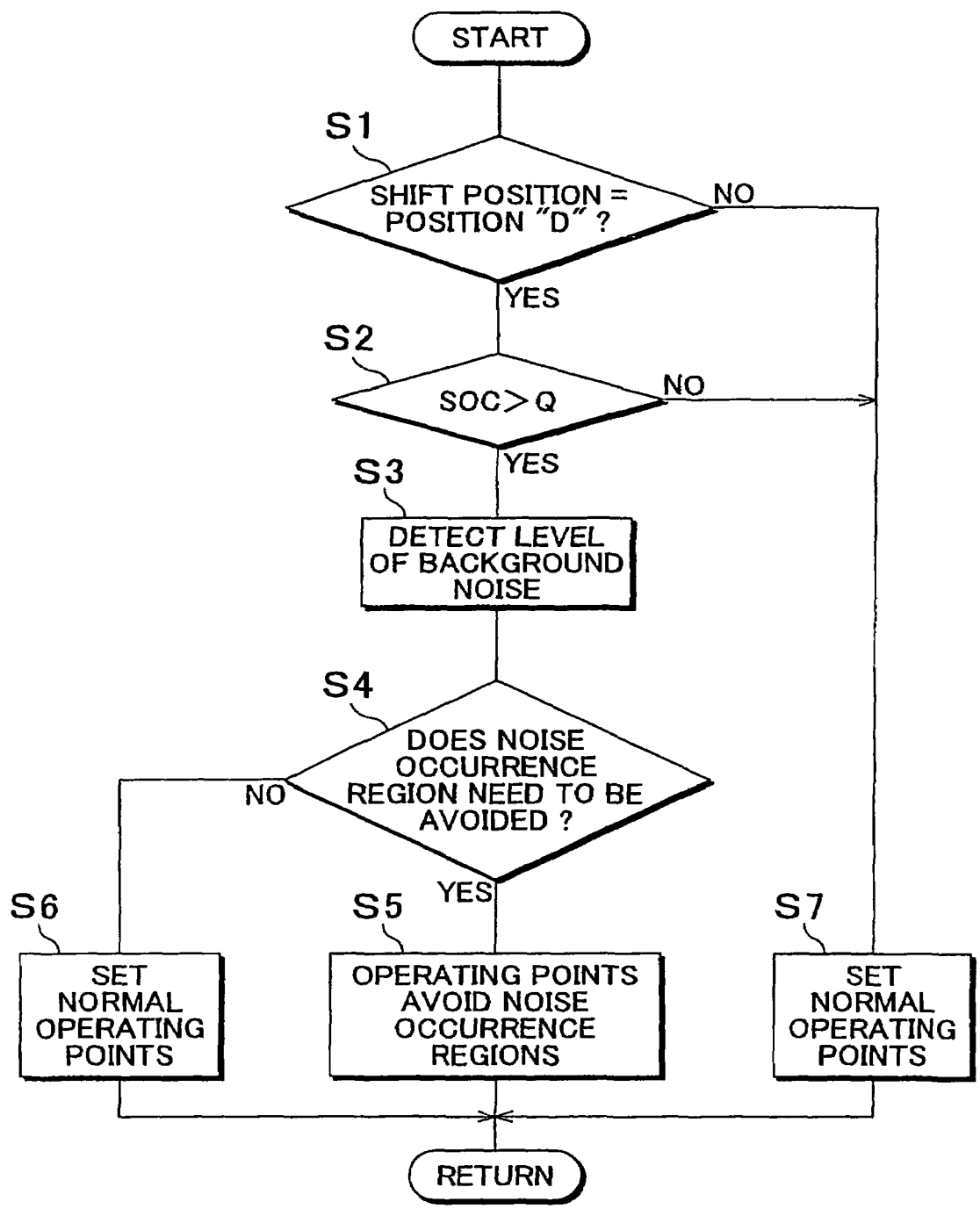
FIG. 13 is a flowchart explaining a control operation performed by the electronic control unit shown in FIG. 4, that is, the control operation for suppressing the occurrence of the noise when the operating point of the engine and the operating point of the motor are determined.
Figure 14:
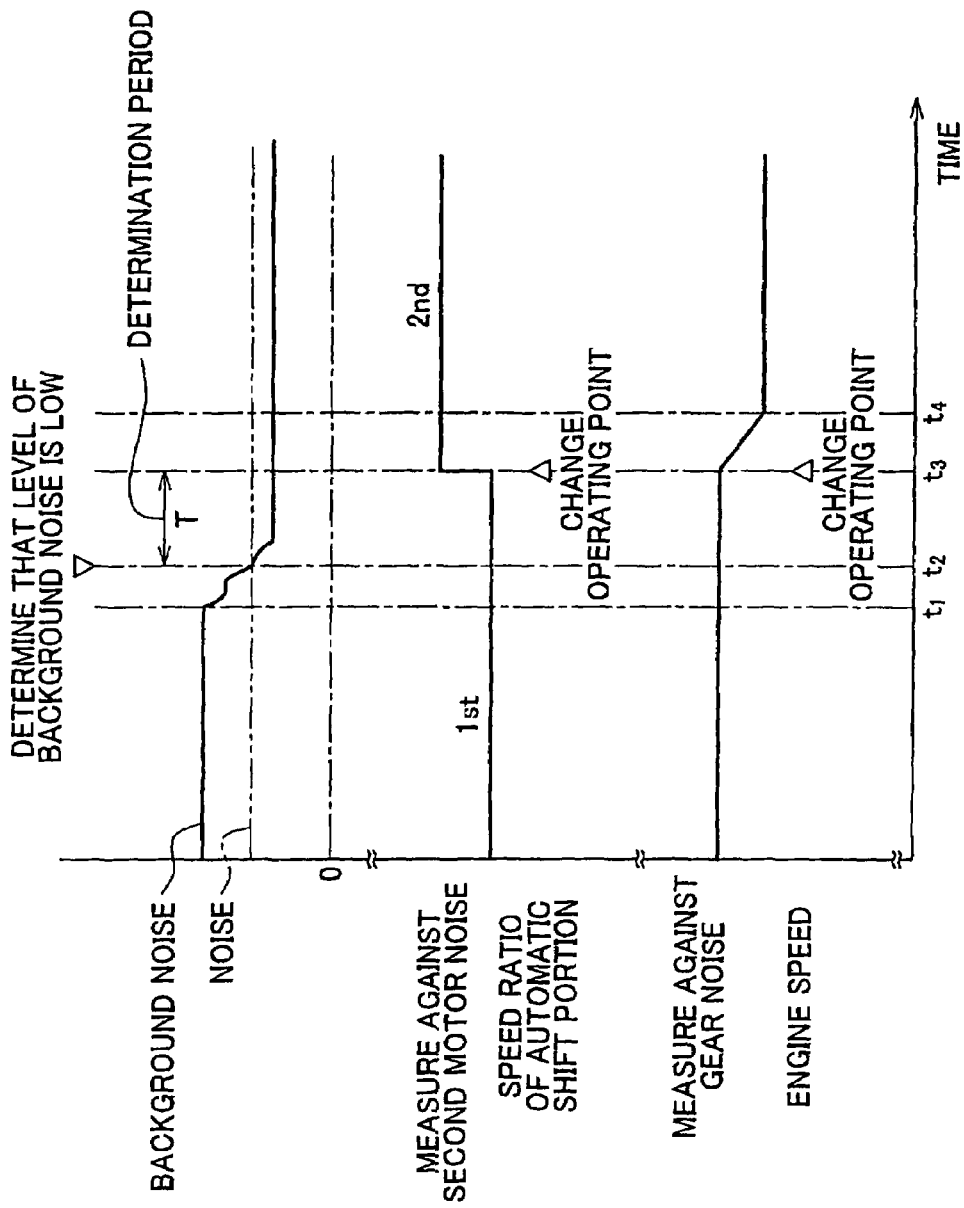
FIG. 14 is a time chart explaining the control operation shown in the flowchart in FIG. 13, and showing an example where the operating points are changed so that the operating points avoid the noise occurrence regions N, because the level of the background noise decreases.

FIG. 13 is a flowchart explaining the main part of the control operation performed by the electronic control unit 80, that is, the control operation for suppressing the occurrence of the noise when the operating point of the engine 8 and the operating point of the motor M are determined. The control operation is performed in an extremely short cycle time of, for example, approximately several msec to several tens of msec, and is repeatedly performed. FIG. 14 is a time chart explaining the control operation shown in the flowchart in FIG. 13. FIG. 14 shows an example where the operating points are changed so that the operating points avoid the noise occurrence region N, because the level of the background noise decreases.

In FIG. 13, first, in step S1 corresponding to the shift position determination device 94, it is determined whether the shift lever 52 is at the position "D", based on the signal indicating the shift position $P_{SH}$ at which the shift lever 52 is placed.

When an affirmative determination is made in step S1, it is determined whether the state of charge SOC of the electric power storage device 56 exceeds the predetermined value Q, in step S2 corresponding to the state-of-charge determination device 92. For example, it is determined whether there is a sufficient amount of electric power for the second motor M2 to output sufficient torque when the vehicle is driven in the motor-driven mode.

When a negative determination is made in step S1, or when a negative determination is made in step S2, the avoidance control for avoiding the noise occurrence region N is not executed, and the normal operating points are set, i.e., the operating point of the engine 8, the operating points of the first motor M1 and the second motor M2, and the speed ratio γ of the automatic shift portion 20 are set based on the system efficiency of the shift mechanism 10 in step S7 corresponding to the noise region avoidance device 86, the stepped shift control device 82, and the hybrid control device 84. Thus, the vehicle is placed in the vehicle condition where the optimum system efficiency is achieved in terms of fuel consumption.

When an affirmative determination is made in step S2, the level of the background noise is detected or estimated in step S3 corresponding to the background noise detection device 90.

Next, in step S4 corresponding to the noise region avoidance determination device 88, for example, the level of the noise is estimated based on the actual vehicle condition according to the noise map that is empirically defined and stored in advance. In addition, it is determined whether the estimated level of the noise is significantly higher than the level of the background noise detected or estimated in step S3, according to the determination criterion that is empirically defined and set. Then, it is determined whether the noise occurrence region N needs to be avoided, for example, based on whether the level of the noise remains significantly higher than the level of the background noise for the predetermined period T.

When an affirmative determination is made in step S4, the noise occurrence region N is avoided in step S5 corresponding to the noise region avoidance device 86, the stepped shift control device 82, and the hybrid control device 84. For example, when the operating point of the motor M is in the noise occurrence region N as shown by the operating point A in FIG. 10, the operating point of the motor M is changed from the operating point A to the operating point B so that the operating point of the motor M avoids the noise occurrence region N. For example, when the operating point of the engine 8 is in the noise occurrence region N as shown by the operating point A in FIG. 11, the operating point of the engine 8 is changed from the operating point A to the operating point B so that the operating point of the engine 8 avoids the noise occurrence region N. This makes the noise unnoticeable as compared to the background noise.

When a negative determination is made in step S4, the avoidance control for avoiding the noise occurrence region N is not executed even if the operating points are in the noise occurrence region N, and the normal operating points are set, i.e., the operating point of the engine 8, the operating points of the first motor M1 and the second motor M2, and the speed ratio γ of the automatic shift portion 20 are set based on the system efficiency of the shift mechanism 10 in step S6 corresponding to the noise region avoidance device 86, the stepped shift control device 82, and the hybrid control device 84. Thus, the vehicle is placed in the vehicle condition where the optimum system efficiency is achieved in terms of fuel consumption.

In FIG. 14, the background noise decreases after time point $t_1$, and it is determined that the level of the noise is significantly higher than the level of the background noise, at time point $t_2$. Then, it remains determined that the level of the noise is significantly higher than the level of the background noise for the predetermined period T until time point $T_3$, and the operating points are changed at time point $T_3$. At time point $T_3$, for example, as a measure against the noise of the second motor M2, the operating point of the second motor M2 is changed so that the operating point of the second motor M2 avoids the noise occurrence region N, by making the automatic shift portion 20 upshift from the first gear to the second gear to decrease the second-motor rotational speed $N_{M2}$. Alternatively, as a measure against the gear noise, the operating point of the engine 8 is changed so that the operating point of the engine 8 avoids the noise occurrence region N, by making the automatic shift portion 20 upshift or changing the speed ratio γ0 of the differential portion 11 to decrease the engine speed $N_E$. The change of the operating point of the engine 8 is completed at time point $t_4$. Although the upshift is performed in the first embodiment, a downshift may be performed to avoid the noise occurrence region N. In this case, the engine speed $N_E$ is increased and the level of the engine noise (background noise) is increased. Therefore, it is possible to obtain the additional advantageous effect that the gear noise is made more unnoticeable due to the increased engine noise.

As described above, in the first embodiment, when the operating point of the motor M determined based on the system efficiency is in the noise occurrence region N, the noise region avoidance device 86 changes the operating point of the motor M so that the operating point of the motor M avoids the noise occurrence region N. Therefore, it is possible to suppress the occurrence of the noise that is noticeable at the specific operating point of the motor M.

In the first embodiment, when the operating point of the engine 8 determined based on the system efficiency is in the noise occurrence region N, the noise region avoidance device 86 changes the operating point of the engine 8 so that the operating point of the engine 8 avoids the noise occurrence region N. Therefore, it is possible to suppress the occurrence of the noise that is noticeable at the specific operating point of the engine 8.

In the first embodiment, the vehicle condition determined based on the system efficiency is in the noise occurrence region N, the noise region avoidance device 86 changes the operating point of the motor M and/or the operating point of the engine 8 so that the operating point of the motor M and/or the operating point of the engine 8 avoid(s) the noise occurrence region(s) N, by changing the speed ratio γ of the automatic shift portion 20. Therefore, it is possible to suppress the occurrence of the noise that is noticeable at the specific operating point of the motor M and/or the specific operating point of the engine 8.

In the first embodiment, the noise region avoidance device 86 executes the avoidance control for avoiding the noise occurrence region N, when the noise region avoidance determination device 88 determines that the noise occurrence region N needs to be avoided. Therefore, it is possible to suppress the deterioration of the system efficiency, thereby improving the driveability and the fuel efficiency, as compared to the case where the noise occurrence region N is constantly avoided.

In the first embodiment, the noise region avoidance determination device 88 determines whether the noise occurrence region N needs to be avoided, based on whether the level of the noise is significantly higher than the level of the background noise. Thus, only when the level of the noise is significantly higher than the level of the background noise, the noise occurrence region N is avoided. Therefore, it is possible to suppress the deterioration of the system efficiency, thereby improving the driveability and the fuel efficiency.

In the first embodiment, the noise region avoidance determination device 88 determines that the noise occurrence region N needs to be avoided, when the level of the noise remains significantly higher than the level of the background noise for the predetermined period. Therefore, it is possible to prevent the avoidance control for avoiding the noise occurrence region N from being repeatedly executed and stopped in a short period. Thus, the vehicle condition is stabilized.

Next, a second embodiment of the invention will be described. In the following description, the same and corresponding portions as in the first embodiment will be denoted by the same reference numerals, and the description thereof will be omitted.

Next, the second embodiment will be described. In the first embodiment, the avoidance control is executed to avoid the noise occurrence region N defined in advance on the motor map as shown in FIG. 10, or the noise occurrence region N defined in advance on the fuel efficiency map as shown in FIG. 11. In the second embodiment, a noise occurrence region N defined in advance on a shift map is avoided. That is, according to the operating point change command X, the shift control for the automatic shift portion 20 is executed to avoid the noise occurrence region N, using the shift map.

Figure 15:
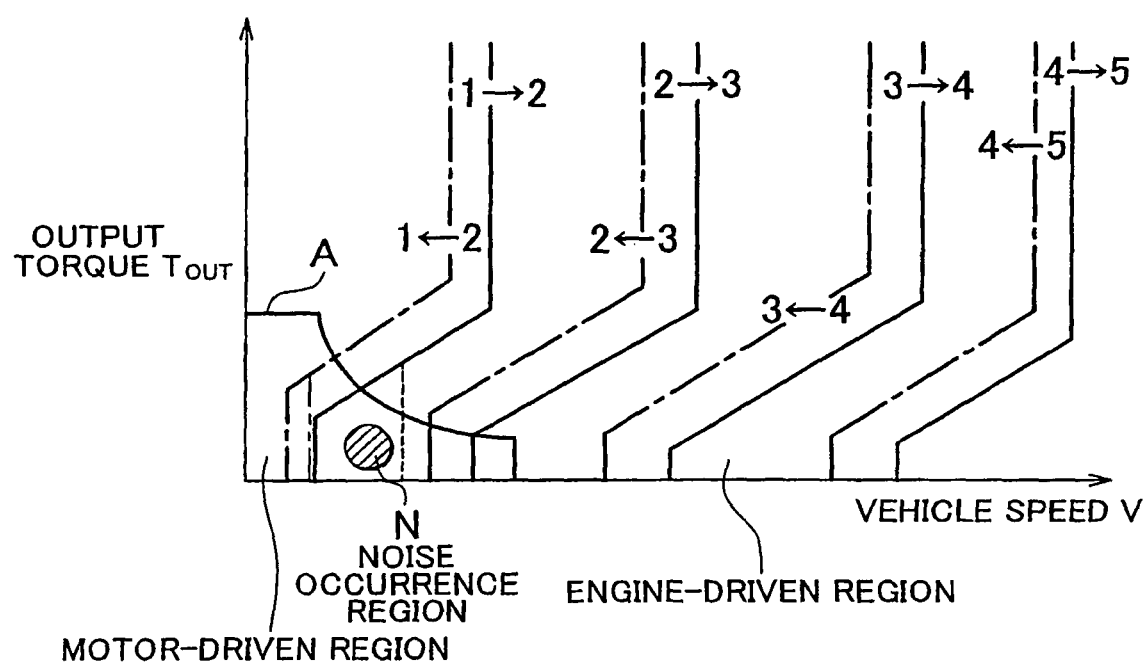
FIG. 15 is a shift map according to a second embodiment of the invention, which corresponds to the shift map according to the first embodiment in FIG. 8, and in which the hatched circle portion N is an example of the noise occurrence region N, the dash line is a noise avoidance upshift line for an upshift from the first gear to the second gear, which is set by changing a normal upshift line for the upshift from the first gear to the second gear, and the two-dot chain line is a noise avoidance downshift line for a downshift from the second gear to the first gear, which is set by changing a normal downshift line for the downshift from the second gear to the first gear.

FIG. 15 is the same as the shift map shown in FIG. 8. The hatched circle portion N is an example of the noise occurrence region N. The dash line is a noise avoidance upshift line for an upshift from the first gear to the second gear, which is set to avoid the noise occurrence region N. The noise avoidance upshift line for the upshift from the first gear to the second gear is set by changing a normal upshift line for the upshift from the first gear to the second gear, which is set based on the system efficiency. The two-dot chain line is a noise avoidance downshift line for a downshift from the second gear to the first gear, which is set to avoid the noise occurrence region N. The noise avoidance downshift line for the downshift from the second gear to the first gear is set by changing a normal downshift line for the downshift from the second gear to the first gear, which is set based on the system efficiency.

When the vehicle condition, which is indicated by the actual vehicle speed V and the required torque $T_{OUT}$ output from the automatic shift portion 20, is in the noise occurrence region N, the noise region avoidance device 86 changes the speed ratio γ of the automatic shift portion 20 by changing the upshift/downshift lines from the normal upshift/downshift lines to the noise avoidance upshift/downshift lines. Each of the upshift/downshift lines indicates a series of shift points used to determine that the automatic shift portion 20 needs to upshift/downshift.

In the case where the noise region avoidance determination device 88 determines that the noise occurrence region N does not need to be avoided during the noise avoidance control for avoiding the noise occurrence region N, the noise region avoidance device 86 changes the upshift/downshift lines from the noise avoidance upshift/downshift lines to the normal upshift/downshift lines when it is determined that the speed ratio γ of the automatic shift portion 20 will not be changed by changing the upshift/downshift lines to the normal upshift/downshift lines (i.e., when it is determined that the automatic shift portion 20 will not be shifted by changing the upshift/downshift lines to the normal upshift/downshift lines). This avoids the situation where, for example, a downshift is performed and shock is suddenly caused by changing the upshift/downshift lines to the normal upshift/downshift lines, and the occupant feels discomfort.

Figure 16:
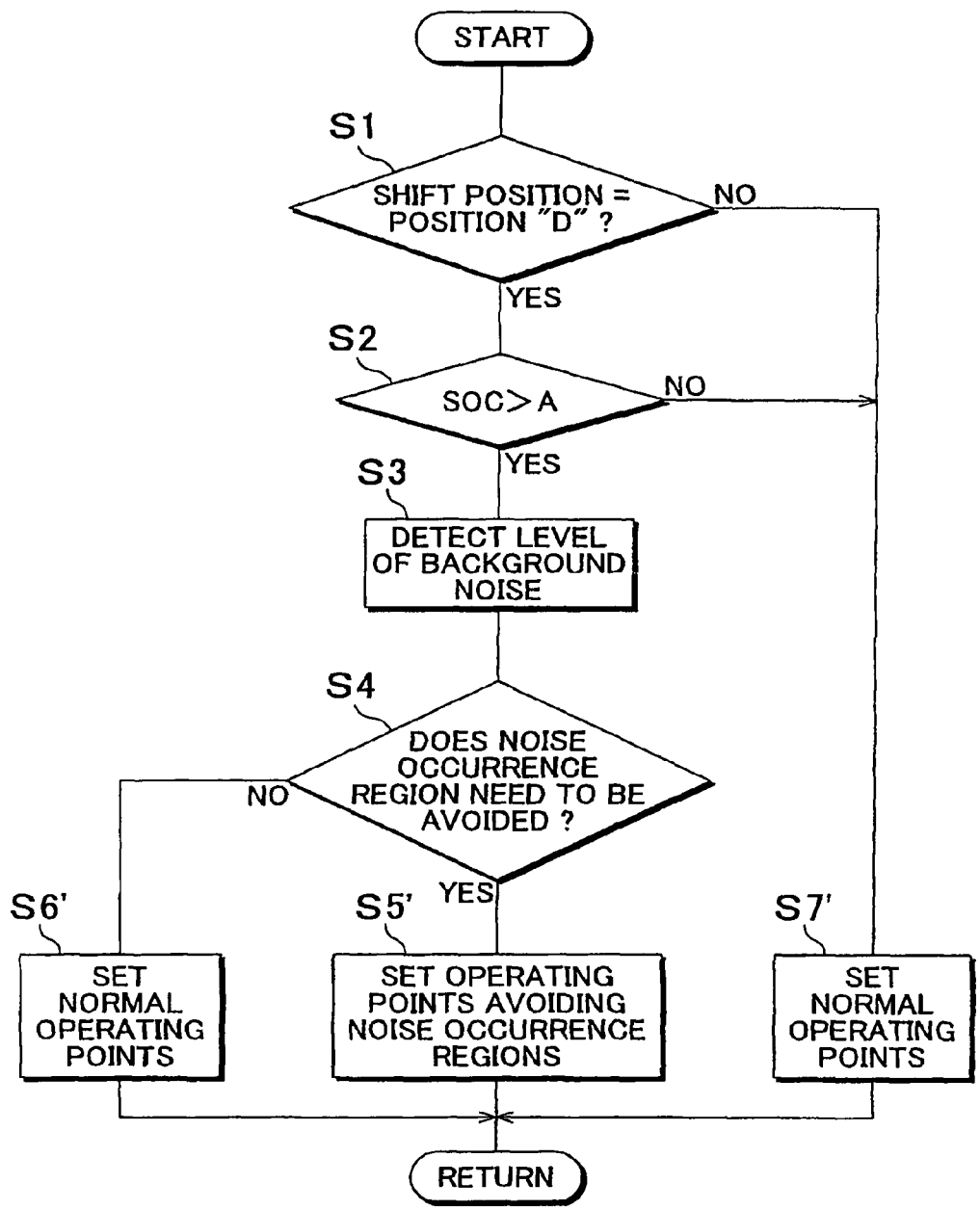
FIG. 16 is a flowchart explaining a control operation performed by the electronic control unit shown in FIG. 4, that is, the control operation for suppressing the occurrence of the noise when the operating point of the engine and the operating point of the motor are determined according to the second embodiment, FIG. 16 corresponding to the flowchart in FIG. 13.
Figure 17:
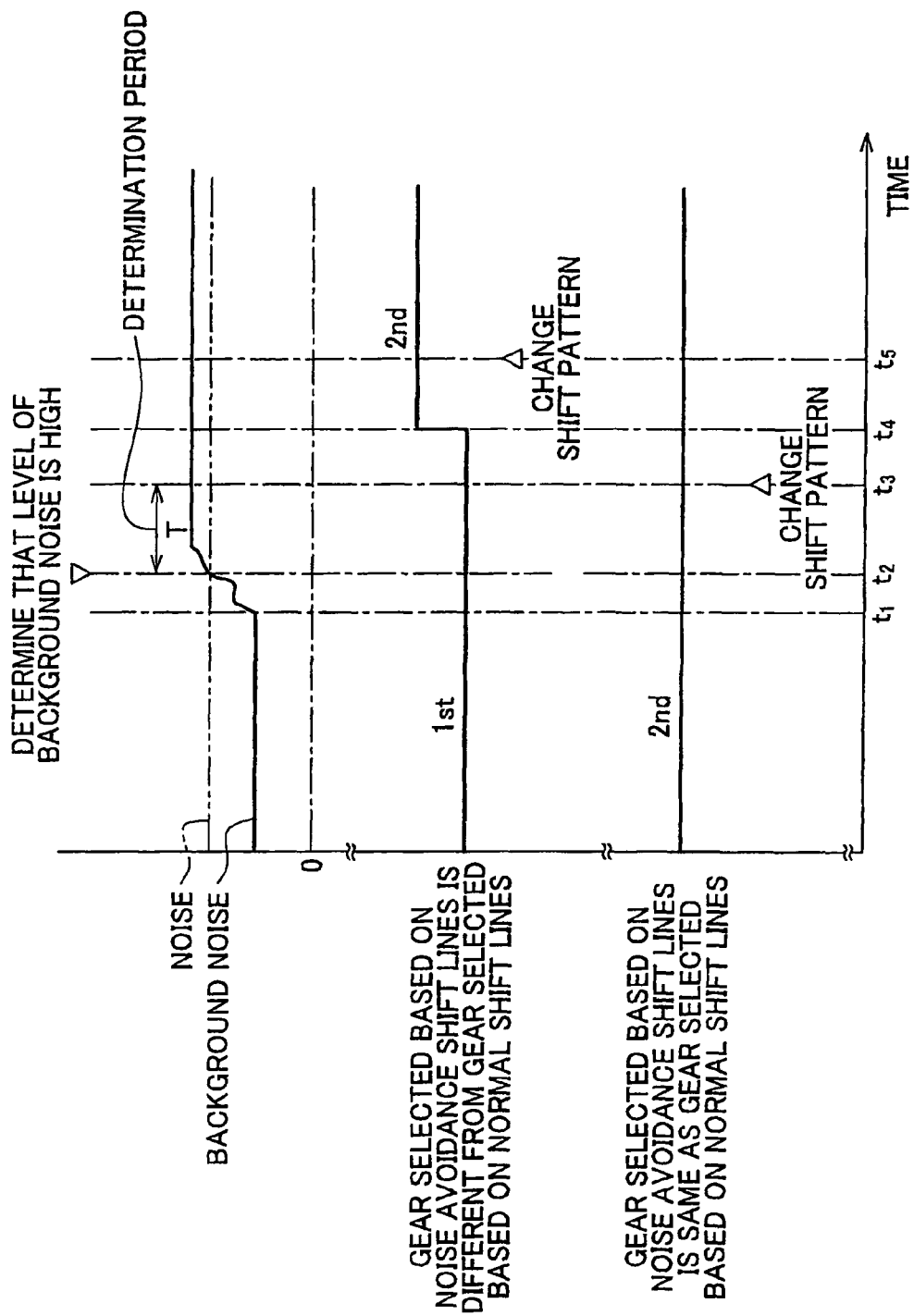
FIG. 17 is a time chart which explaining the control operation shown in the flowchart in FIG. 16, and showing an example where the level of the background noise increases, and therefore, the avoidance of the noise occurrence region N is stopped by changing the shift lines according to the second embodiment, FIG. 17 corresponding to FIG. 14.

FIG. 16 is a flowchart explaining the main part of the control operation performed by the electronic control unit 80, that is, the control operation for suppressing the occurrence of the noise when the operating point of the engine 8 and the operating point of the motor M are determined. The control operation is performed in an extremely short cycle time of, for example, approximately several msec to several tens of msec, and is repeatedly performed. FIG. 16 is the flowchart according to the second embodiment, which corresponds to the flowchart in FIG. 13 according to the first embodiment. The flowchart in FIG. 16 differs from the flowchart in FIG. 13, mainly in that steps S5 to S7 in the flowchart in FIG. 13 are changed to steps S5' to S7'. Hereinafter, steps S5' to S7', which are the features of the flowchart in FIG. 16, will be described. FIG. 17 is a time chart explaining the control operation shown in the flowchart in FIG. 16. FIG. 17 shows an example where the level of the background noise increases, and therefore, the avoidance of the noise occurrence region N is stopped by changing the shift lines.

In FIG. 16, when a negative determination is made in step S1, or when a negative determination is made in step S2, the avoidance control for avoiding the noise occurrence region N is not executed, and the normal shift points are set, that is, the normal upshift/downshift lines are set based on the system efficiency of the shift mechanism 10, in step S7' corresponding to the noise region avoidance device 86, the stepped shift control device 82, and the hybrid control device 84. Thus, the vehicle is placed in the vehicle condition where the optimum system efficiency is achieved in terms of fuel consumption.

When an affirmative determination is made in step S4, the noise occurrence region N is avoided in step S5' corresponding to the noise region avoidance device 86, the stepped shift control device 82, and the hybrid control device 84. For example, when the vehicle condition is in the noise occurrence region N as shown in FIG. 15, the vehicle condition is changed so that the vehicle condition avoids the noise occurrence region N, by changing the upshift/downshift lines from the normal upshift/downshift lines to the noise avoidance upshift/downshift lines to change the speed ratio γ of the automatic shift portion 20.

When a negative determination is made in step S4, the avoidance control for avoiding the noise occurrence region N is not executed even if the vehicle condition is in the noise occurrence region N, and the normal shift points are set, i.e., the normal upshift lines and the normal downshift lines are set based on the system efficiency of the shift mechanism 10, in step S6' corresponding to the noise region avoidance device 86, the stepped shift control device 82, and the hybrid control device 84. Thus, the vehicle is placed in the vehicle condition where the optimum system efficiency is achieved in terms of fuel consumption.

In FIG. 17, the background noise increases after time point $t_1$, and it is determined that the level of the noise is not significantly higher than the level of the background noise, at time point $t_2$. Then, it remains determined that the level of the noise is not significantly higher than the level of the background noise for the predetermined period T until time point $T_3$. When it is determined that the speed ratio γ of the automatic shift portion 20 will not be changed by changing the shift lines from the noise avoidance shift lines to the normal shift lines at time point $T_3$ (i.e., when the gear of the automatic shift portion 20 selected based on the noise avoidance shift lines is the same as the gear selected based on the normal shift lines), the shift lines are changed from the noise avoidance shift lines to the normal shift lines (i.e., the shift pattern is changed) at time point $T_3$. Because the shift lines are changed to the normal shift lines at time point $T_3$ when it is determined that the speed ratio γ of the automatic shift portion 20 will not be changed by changing the shift lines at time point $T_3$, the automatic shift portion 20 does not shift. When it is determined that the speed ratio γ of the automatic shift portion 20 will be changed by changing the shift lines from the noise avoidance shift lines to the normal shift lines at time point $T_3$ (i.e., when the gear of the automatic shift portion 20 selected based on the noise avoidance shift lines is different from the gear selected based on the normal shift lines), the shift lines are not changed from the noise avoidance shift lines to the normal shift lines at time point $T_3$. In this case, when it is determined that speed ratio γ of the automatic shift portion 20 will not be changed after shift is performed at time point $t_4$, the shift lines are changed from the noise avoidance shift lines to the normal shift lines at time point $t_5$. The period from time point $t_4$ to time point $t_5$ is set taking into account a period from when a shift command is output at time point $t_4$ until when the shift is completed. Thus, when it is determined that the speed ratio γ of the automatic shift portion 20 will not be changed by changing the shift lines from the noise avoidance shift lines to the normal shift lines, the shift lines are changed from the noise avoidance shift lines to the normal shift lines. Therefore, it is particularly possible to avoid the situation where shock is suddenly caused by performing a downshift, and the occupant feels discomfort.

As described above, in the second embodiment, when the vehicle condition determined based on the system efficiency is in the noise occurrence region N, the noise region avoidance device 86 changes the speed ratio γ of the automatic shift portion 20 so that the vehicle condition avoids the noise occurrence region N. Therefore, it is possible to suppress the occurrence of the noise that is noticeable at the specific speed ratio γ of the automatic shift portion 20, as in the above-described first embodiment.

In the second embodiment, the noise region avoidance device 86 changes the speed ratio γ of the automatic shift portion 20 by changing the shift lines from the normal shift lines to the noise avoidance shift lines. Therefore, it is possible to easily avoid the noise occurrence region N.

In the second embodiment, the noise region avoidance device 86 changes the shift lines from the noise avoidance shift lines to the normal shift lines, when it is determined that the speed ratio γ of the automatic shift portion 20 will not be changed by changing the shift lines. Therefore, it is possible to avoid the situation where, for example, a downshift is performed and shock is suddenly caused by changing the shift lines to the normal shift lines, and the occupant feels discomfort.

Figure 18:
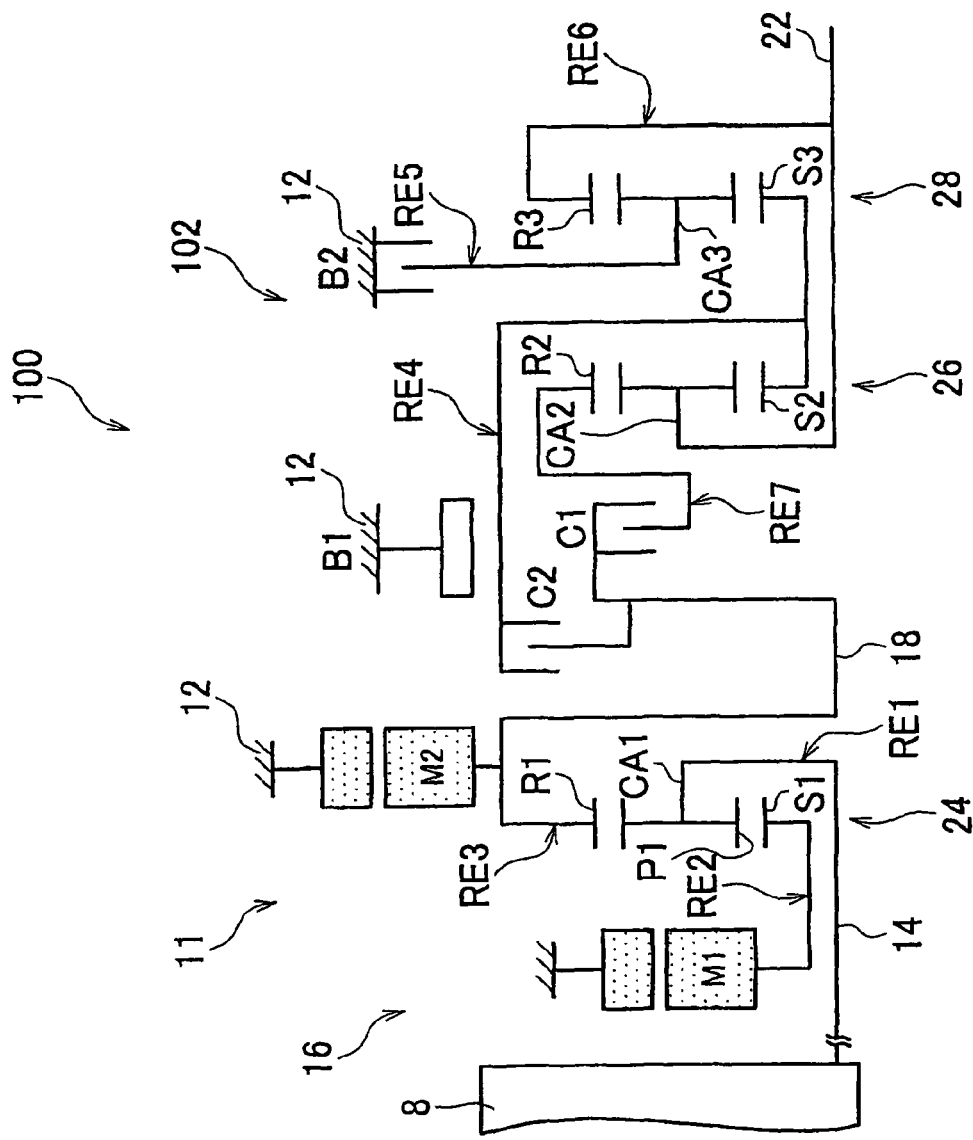
FIG. 18 is a schematic diagram explaining the configuration of a drive apparatus for a hybrid vehicle, to which a control apparatus for a vehicular drive apparatus according to a third embodiment of the invention is applied, FIG. 18 corresponding to FIG. 1.
Figure 20:
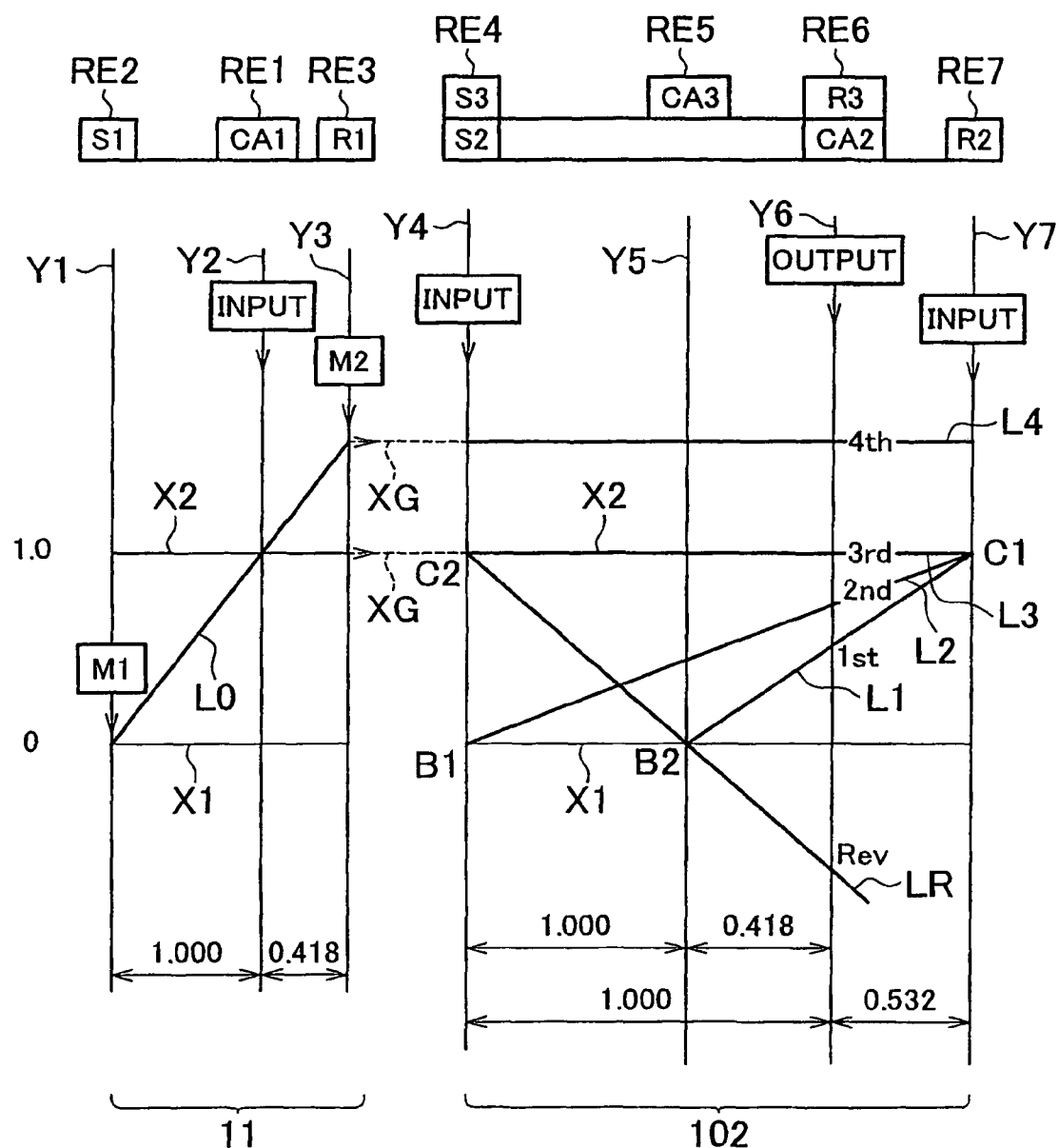
FIG. 20 is a collinear diagram explaining the relative rotational speeds at each gear in the drive apparatus in FIG. 18, FIG. 20 corresponding to FIG. 3.

Next, a third embodiment will be described. FIG. 18 is a schematic diagram explaining the configuration of a shift mechanism 100 according to the third embodiment of the invention. FIG. 19 is an engagement table showing the combinations of operations of the hydraulic frictional engagement devices used in the shift operation of the shift mechanism 100. FIG. 20 is a collinear diagram explaining the shift operation of the shift mechanism 100.

As in the first embodiment, the shift mechanism 100 includes the differential portion 11 and an automatic shift portion 102 with forward three gears. The differential portion includes the first motor M1, the power split mechanism 16, and the second motor M2. The automatic shift portion 102 is provided between the differential portion 11 and the output shaft 22, and connected to the differential portion 11 via the transmitting member 18 in series. The power split mechanism 16 includes the first planetary gear unit 24. The first planetary gear unit 24 is of a single pinion type, and has the predetermined gear ratio ρ1 of, for example, approximately "0.418". The automatic shift portion 102 includes the second planetary gear unit 26 and the third planetary gear unit 28. The second planetary gear unit 26 is of a single pinion type, and has the predetermined gear ratio ρ2 of, for example, approximately "0.532". The third planetary gear unit 28 is of a single pinion type, and has the predetermined gear ratio ρ3 of, for example, approximately "0.418". The second sun gear S2 of the second planetary gear unit 26 and the third sun gear S3 of the third planetary gear unit 28, which are integrally connected to each other, are selectively connected to the transmitting member 18 via the second clutch C2. Also, the second sun gear S2 and the third sun gear S3 are selectively connected to the case 12 via the first brake B1. The second carrier CA2 of the second planetary gear unit 26 and the third ring gear R3 of the third planetary gear unit 28, which are integrally connected to each other, are connected to the output shaft 22. The second ring gear R2 is selectively connected to the transmitting member 18 via the first clutch C1. The third carrier CA3 is selectively connected to the case 12 via the second brake B2.

Thus, the automatic shift portion 102 is selectively connected to the differential portion 11 (the transmitting member 18) via the first clutch C1 or the second clutch C2 that is used to select the gear of the automatic shift portion 102. In other words, each of the first clutch C1 and the second clutch C2 functions as the engagement device that selectively switches the state of the power transmission path between the transmitting member 18 and the automatic shift portion 102, that is, the power transmission path from the differential portion 11 (the transmitting member 18) to the drive wheels 34. The state of the power transmission path is selectively switched between the power-transmission permitted state and the power-transmission interrupted state. When the power transmission path is in the power-transmission permitted state, the transmission of power is permitted. When the power transmission path is in the power-transmission interrupted state, the transmission of power is interrupted. That is, when at least one of the first clutch C1 and the second clutch C2 is engaged, the power transmission path is placed in the power-transmission permitted state. When the first clutch C1 and the second clutch C2 are disengaged, the power transmission path is placed in the power-transmission interrupted state.

When the disengagement-side engagement device is disengaged, and the engagement-side engagement device is engaged in the automatic shift portion 102, a clutch-to-clutch shift is performed. As a result, any one of the first gear to the third gear, or the reverse gear, or the neutral state is selected. Thus, the speed ratio γ (=the transmitting-member rotational speed $N_{18}$/the output-shaft rotational speed $N_{OUT}$) at each gear is achieved. The speed ratio γ changes substantially geometrically. For example, as shown in the engagement operation table in FIG. 19, the first gear, at which a speed ratio γ1 is set to the maximum value, for example, approximately "2.804", is selected by engaging the first clutch C1 and the second brake B2. The second gear, at which a speed ratio γ2 is set to a value smaller than the speed ratio γ1, for example, approximately "1.531", is selected by engaging the first clutch C1 and the first brake B1. The third gear, at which a speed ratio γ3 is set to a value smaller than the speed ratio γ2, for example, approximately "1.000", is selected by engaging the first clutch C1 and the second clutch C2. The reverse gear, at which a speed ratio γR is set to a value between the speed ratios γ1 and γ2, for example, approximately "2.393", is selected by engaging the second clutch C2 and the second brake B2. The neutral state "N" is selected by disengaging the first clutch C1, the second clutch C2, the first brake B1, and the second brake B2. As shown in the engagement operation table in FIG. 19, the clutches C1 and C2 are engaged at the fourth gear as well as at the third gear.

In the shift mechanism 100 that has the above-described configuration, the CVT is formed by combining the differential portion 11 that functions as the CVT with the automatic shift portion 102. When the speed ratio of the differential portion 11 is controlled to be constant, the stepped transmission is substantially formed by combining the differential portion 11 with the automatic shift portion 102.

More specifically, when the differential portion 11 functions as the CVT, and the automatic shift portion 102, which is connected to the differential portion 11 in series, functions as the stepped transmission, the rotational speed input to the automatic shift portion 102 (hereinafter, referred to as "input rotational speed for the automatic shift portion 102"), that is, the rotational speed of the transmitting member 18 is continuously changed at least one gear M of the automatic shift portion 102. As a result, the speed ratio is continuously changed in a certain range at the at least one gear M. Accordingly, the total speed ratio γT of the shift mechanism 100 is continuously changed. Thus, the CVT is formed in the shift mechanism 100. The ratio of the speed ratio at a gear to a speed ratio at an adjacent higher gear (i.e., step) is shown in the section "STEP" in FIG. 18. As shown in the section "TOTAL" in FIG. 18, the ratio of the speed ratio at first gear to the speed ratio at the fourth gear is 3.977.

For example, the transmitting-member rotational speed $N_{18}$ is continuously changed at each of the first gear to the third gear, and the reverse gear of the automatic shift portion 102 shown in the engagement operation table in FIG. 19. That is, the speed ratio is continuously changed in a certain range at each of the first gear to the third gear. As a result, the speed ratio is continuously changed between the first gear and the second gear, and between the second gear and the third gear. Accordingly, the total speed ratio γT of the entire shift mechanism 100 is continuously changed.

When the speed ratio of the differential portion 11 is controlled to be constant, and the clutches C and the brakes B are selectively engaged to select any one of the first gear to the third gear, and the reverse gear, the total speed ratio γT of the entire shift mechanism 100 at each gear is achieved. The total speed ratio γT changes substantially geometrically. Accordingly, in the shift mechanism 100, the stepped transmission is substantially formed.

For example, when the speed ratio γ0 of the differential portion 11 is controlled to be fixed to "1", the total speed ratio γT of the shift mechanism 100 at each of the first gear to the third gear, and the reverse gear of the automatic shift portion 102 is achieved, as shown in the engagement operation table in FIG. 19. When the speed ratio γ0 of the differential portion 11 is fixed to a value smaller than "1", for example, approximately 0.7, at the third gear of the automatic shift portion 102, the total speed ratio γT is set to a value smaller than "1" at the third gear, for example, approximately "0.705". That is, the total speed ratio γT at the fifth gear is achieved, as shown in the engagement operation table in FIG. 19.

FIG. 20 is a collinear diagram in which straight lines indicate the relative relation among the rotational speeds of the rotational elements in the shift mechanism 100 that includes the differential portion 11 and the automatic shift portion 102. Each of the rotational elements is in the connected state or in the disconnected state at each gear.

In the automatic shift portion 102 in FIG. 20, the vertical line Y4 indicates the relative rotational speed of the second sun gear S2 and the third sun gear S3, which are connected to each other, and which are regarded as the fourth rotational element (fourth element) RE4. The vertical line Y5 indicates the relative rotational speed of the third carrier CA3 that is regarded as the fifth rotational element (fifth element) RE5. The vertical line Y6 indicates the relative rotational speed of the second carrier CA2 and the third ring gear R3, which are connected to each other, and which are regarded as the sixth rotational element (sixth element) RE6. The vertical line Y7 indicates the relative rotational speed of the second ring gear R2 that is regarded as the seventh rotational element (seventh element) RE7. In the automatic shift portion 102, the fourth rotational element RE4 is selectively connected to the transmitting member 18 via the clutch C2. Also, the fourth rotational element RE4 is selectively connected to the case 12 via the first brake B1. The fifth rotational element RE5 is selectively connected to the case 12 via the second brake B2. The sixth rotational element RE6 is connected to the output shaft 22 of the automatic shift portion 102. The seventh rotational element RE7 is selectively connected to the transmitting member 18 via the first clutch C1.

When the straight line L0 matches the horizontal line X2 in the differential portion 11, and the rotational speed that is equal to the engine speed $N_E$ is input to the seventh rotational element RE7 from the differential portion 11, the rotational speed of the output shaft 22 at the first gear is indicated by the intersection of the oblique straight line L1 and the vertical line Y6 in the automatic shift portion 102, as shown in FIG. 20. The straight line L1 is set by engaging the first clutch C1 and the second brake B2. The straight line L1 passes through the intersection of the vertical line Y7 that indicates the rotational speed of the seventh rotational element RE7 (R2), and the horizontal line X2, and the intersection of the vertical line Y5 that indicates the rotational speed of the fifth rotational element RE5 (CA3) and the horizontal line X1. The vertical line Y6 indicates the rotational speed of the sixth rotational element RE6 (CA2, R3) connected to the output shaft 22. Similarly, the rotational speed of the output shaft 22 at the second gear is indicated by the intersection of the oblique straight line L2 and the vertical line Y6. The straight line L2 is set by engaging the first clutch C1 and the first brake B1. The rotational speed of the output shaft 22 at the third gear is indicated by the intersection of the oblique straight line L3 and the vertical line Y6. The straight line L3 is set by engaging the first clutch C1 and the second clutch C2.

When the straight line L0 is set in the differential portion 11 as shown in FIG. 20, and the rotational speed that is higher than the engine speed $N_E$ is input to the seventh rotational element RE7 from the differential portion 11, the rotational speed of the output shaft 22 at the fourth gear is indicated by the intersection of the horizontal straight line L4 and the vertical line Y6. The straight line L4 is set by engaging the first clutch C1 and the second clutch C2.

In the third embodiment as well, because the shift mechanism 100 includes the differential portion 11 and the automatic shift portion 102, it is possible to obtain the same effects as those obtained in the first embodiment.

The embodiments of the invention have been described in detail with reference to the drawings. However, the invention may be realized in combination of the above-described embodiments, and in other embodiments.

For example, in each of the above-described embodiments, when the noise region avoidance device 86 changes the operating point of the engine 8, the noise region avoidance device 86 changes the operating point of the engine 8 to a point on the constant power line P so that the operating point of the engine 8 avoids the noise occurrence region N. However, the noise region avoidance device 86 may change the operating point of the engine 8 along the optimum fuel efficiency curve. In this case, the output from the engine 8 (power provided by the engine 8) is changed. Therefore, for example, when the power provided by the engine 8 is decreased, the amount of torque provided by the second motor M2 is increased. When the power provided by the engine 8 is increased, the torque provided by the second motor M2 is decreased.

In each of the above-described embodiments, the shift mechanism 10 or 100 is employed as the vehicular drive apparatus to which the invention is applied. However, the invention is not limited to the shift mechanism 10 or 100. The invention may be applied to various vehicular drive apparatuses which include a motor operated by electric energy, and an engine operated by combustion of fuel, as power sources for driving a vehicle, and in which the operating point of the engine and the operating point of the motor are determined based on the system efficiency.

Also, in the power split mechanism 16 in each of the above-described embodiments, the first carrier CA1 is connected to the engine 8, the first sun gear S1 is connected to the first motor M1, and the first ring gear R1 is connected to the transmitting member 18. However, the connection relation is not necessarily limited to this. Each of the engine 8, the first motor M1, and the transmitting member 18 may be connected to any of the three elements CA1, S1, and R1 of the first planetary gear unit 24.

In each of the above-described embodiments, the engine 8 is directly connected to the input shaft 14. However, for example, the engine 8 may be operatively connected to the input shaft 14 via a gear, a belt, or the like. The engine 8 and the input shaft 14 do not necessarily need to be provided on a common axis.

In each of the above-described embodiments, the first motor M1 and the second motor M2 are disposed coaxially with the input shaft 14, the first motor M1 is connected to the first sun gear S1, and the second motor M2 is connected to the transmitting member 18. However, the first motor M1 and the second motor M2 do not necessarily need to be provided in this manner. For example, the first motor M1 may be operatively connected to the first sun gear S1 via a gear, a belt, a reducer, or the like, and the second motor M2 may be operatively connected to the transmitting member 18 via a gear, a belt, a reducer, or the like.

In each of the above-described embodiments, each of the hydraulic frictional engagement devices, such as the first clutch C1 and the second clutch C2, may be a magnetic-particle engagement device such as a magnetic-particle clutch, an electromagnetic engagement device such as an electromagnetic clutch, or a mechanical clutch such as a mesh dog clutch. For example, when the electromagnetic clutch is employed, the hydraulic control circuit 70 is not the valve device that switches the oil passage. Instead, the hydraulic control circuit 70 may be a switching device, an electromagnetic switching device, or the like, which switches the state of an electric instruction signal circuit that provides an electric instruction signal to the electromagnetic clutch.

In each of the above-described embodiments, the automatic shift portion 20 or 102 is provided in the power transmission path between the transmitting member 18, which is the output member of the differential portion 11 (i.e., the power split mechanism 16), and the drive wheels 34. However, other types of power transmission portions (transmissions) may be provided in the power transmission path. For example, a continuously variable transmission (CVT) that is one of automatic transmissions, or a synchromesh manual transmission in which a gear is manually selected may be provided. Alternatively, an automatic transmission of a constant mesh parallel two-axes type in which a gear is automatically selected using a select cylinder and a shift cylinder may be provided (although a manual transmission of a constant mesh parallel two-axes type is well known). The invention may be also applied to these cases.

In each of the above-described embodiments, the automatic shift portion 20 or 102 is connected to the differential portion 11 in series via the transmitting member 18. However, the input shaft 14 may be provided in parallel with a counter shaft, and the automatic shift portion 20 or 102 may be coaxially provided on the counter shaft. In this case, the differential portion 11 is connected to the automatic shift portion 20 or 102 so that power can be transmitted, via a transmitting member set which includes a counter gear pair, a sprocket, and a chain, and which functions as the transmitting member 18.

In each of the above-described embodiments, the power split mechanism 16, which functions as the differential mechanism, may be a differential gear unit that includes a pinion that is rotated by the engine, and a pair of bevel gears that meshes with the pinion. In this case, the differential gear unit is operatively connected to the first motor M1 and the second motor M2.

In each of the above-described embodiments, the power split mechanism 16 includes one planetary gear unit. However, the power split mechanism 16 may include at least two planetary gear units. When the power split mechanism 16 is in the non-differential mode (the speed-ratio fixed mode), the power split mechanism 16 may function as a transmission with at least three gears. Each of the at least two planetary gear units is not limited to the single pinion planetary gear unit, and may be a double pinion planetary gear unit.

In each of the above-described embodiments, the shift operation device 50 includes the shift lever 52 that is operated to select the shift position $P_{SH}$ among the plurality of positions. Instead of the shift lever 52, other devices may be provided. For example, a switch that can select the shift position $P_{SH}$ among the plurality of positions, such as a push-button switch or a slide switch, a device that can switch the shift position $P_{SH}$ among the plurality of positions in response to the voice of the driver, instead of manual operation, or a device that can switch the shift position $P_{SH}$ among the plurality of positions according to foot operation, may be provided. Also, in each of the above-described embodiments, by moving the shift lever 52 to the position "M", the shift ranges are set. However, the highest gear in each shift range may be set as the gear. In this case, the gear is selected, and the automatic shift portion 20 or 102 shifts to the selected gear. For example, when the shift lever 52 is manually moved to an upshift position "+" or a downshift position "−" in the position "M", one of the first gear to the fourth gear is selected in the automatic shift portion 20 according to the movement of the shift lever 52.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A control apparatus for a vehicular drive apparatus that includes an engine and a motor, comprising:
   a controller that determines an operating point of the engine and an operating point of the motor, based on a characteristic of the vehicular drive apparatus, wherein the operating point of the motor is in a motor noise occurrence region;
   the controller determines that the motor noise occurrence region needs to be avoided based on a level of motor noise being higher than a level of background noise by at least a predetermined value; and the controller changes the operating point of the motor to avoid the motor noise occurrence region when the controller determines that the level of motor noise is higher than the level of background noise by at least the predetermined value, wherein the level of background noise is variable.

2. The control apparatus according to claim 1, wherein when the level of the motor noise remains higher than the level of the background noise by at least the predetermined value for a predetermined period, the controller determines that the motor noise occurrence region needs to be avoided.

* * * * *